United States Patent
Viswanadham et al.

(10) Patent No.: US 9,794,658 B2
(45) Date of Patent: Oct. 17, 2017

(54) CIRCUIT DIAGNOSTIC MANAGER

(71) Applicant: Infinera Corporation, Sunnyvale, CA (US)

(72) Inventors: Pydi Kasi Viswanadham, Bangalore (IN); Lam D. Hoang, San Jose, CA (US); Naveen Narasimha Hegde, Bangalore (IN); Pankaj Sajnani, Bangalore (IN); Rajasekar Venkatesan, Saratoga, CA (US); Yashpal Kumar, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 94 days.

(21) Appl. No.: 14/581,300

(22) Filed: Dec. 23, 2014

(65) Prior Publication Data
US 2016/0182275 A1   Jun. 23, 2016

(51) Int. Cl.
*G02F 1/00*   (2006.01)
*G02F 2/00*   (2006.01)
(Continued)

(52) U.S. Cl.
CPC ..... *H04Q 11/0066* (2013.01); *H04B 10/0771* (2013.01); *H04B 10/0773* (2013.01); *H04L 41/0672* (2013.01); *H04L 41/0677* (2013.01); *H04L 43/0811* (2013.01); *H04L 43/16* (2013.01); *H04Q 2011/0081* (2013.01); *H04Q 2011/0083* (2013.01)

(58) Field of Classification Search
USPC ......... 398/1, 3, 9, 10, 17, 21, 25–28, 33, 36
See application file for complete search history.

(56) References Cited

U.S. PATENT DOCUMENTS 7,190,666 B1 * 3/2007 Collins ............... H04L 47/10
                                                        370/216
7,817,570 B1   10/2010 Anderson et al.
(Continued)

OTHER PUBLICATIONS

Timothy P. Walker, "Optical Transport Network (OTN) Tutorial", https://www.itu.int/ITU-T/studygroups/com15/otn/OTNtutorial.pdf, Feb. 15, 2000, 62 pages.
(Continued)

*Primary Examiner* — David Payne
*Assistant Examiner* — Pranesh Barua
(74) *Attorney, Agent, or Firm* — Harrity & Harrity LLP; David L. Soltz

(57) ABSTRACT

A device may receive health information associated with a network circuit included in an optical network. The device may determine, based on the health information and network circuit information associated with the network circuit, that the network circuit is experiencing a health issue. The device may identify a diagnostic technique to be applied to the network circuit based on determining that the network circuit is experiencing the health issue. The device may automatically and iteratively apply the identified diagnostic technique to the network circuit in order to identify a fault location. The device may determine a corrective action, associated with the network circuit, based on the fault location and the health issue. The device may provide information associated with the corrective action to cause the corrective action to be taken.

17 Claims, 18 Drawing Sheets

(51) Int. Cl.
  *H04B 10/08* (2006.01)
  *H04Q 11/00* (2006.01)
  *H04B 10/077* (2013.01)
  *H04L 12/26* (2006.01)
  *H04L 12/24* (2006.01)

(56) References Cited

U.S. PATENT DOCUMENTS

| | | | | |
|---|---|---|---|---|
| 8,655,167 | B1* | 2/2014 | Lam | H04B 10/071 398/16 |
| 8,724,102 | B2* | 5/2014 | Urban | G01M 11/3136 356/73.1 |
| 8,792,789 | B1* | 7/2014 | Varadarajan | H04B 10/6161 398/159 |
| 2002/0126625 | A1 | 9/2002 | Liu et al. | |
| 2002/0129295 | A1* | 9/2002 | Nishioka | H04B 10/035 714/4.1 |
| 2005/0013241 | A1* | 1/2005 | Beller | H04J 3/085 370/216 |
| 2008/0145048 | A1* | 6/2008 | Wu | H04B 10/071 398/25 |
| 2009/0129773 | A1* | 5/2009 | Oron | H04B 10/0793 398/10 |
| 2010/0014855 | A1* | 1/2010 | Arnone | H04J 14/0227 398/17 |
| 2011/0228789 | A1* | 9/2011 | Jia | H04L 49/201 370/401 |
| 2014/0093233 | A1* | 4/2014 | Gao | H04B 10/0799 398/16 |
| 2014/0133845 | A1* | 5/2014 | Dahlfort | H04B 10/0771 398/12 |
| 2014/0169783 | A1* | 6/2014 | Surek | H04B 10/0791 398/10 |

OTHER PUBLICATIONS

Radhakrishna Valiveti, "OTN Overview," System Architecture Group, Infinera Corporation, https://www.infinera.com/technology/files/infinera-IEEE-OTN-Overview.pdf, Mar. 17, 2012, 25 pages.

International Telecommunication Union, "Interfaces for the optical transport network," ITU-T G.709/Y.1331, Telecommunication Standardization Sector of ITU, Series G: Transmission Systems and Media, Digital Systems and Networks, Digital Terminal Equipments—General, Series Y: Global Information Infrastructure, Internet Protocol Aspects and Next-Generation Networks, Internet protocol aspects—Transport, Feb. 2012, 238 pages.

* cited by examiner

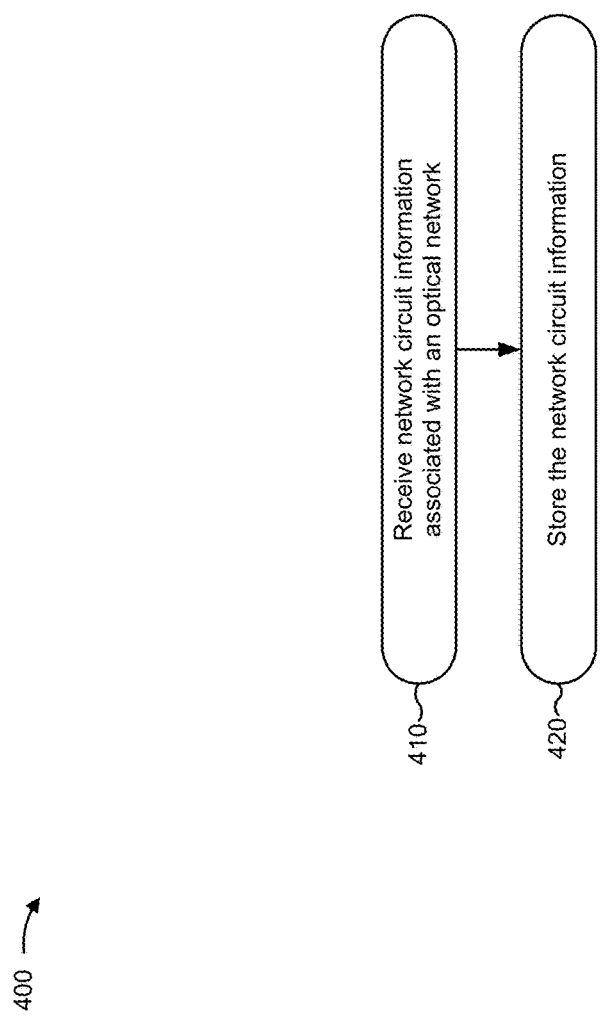

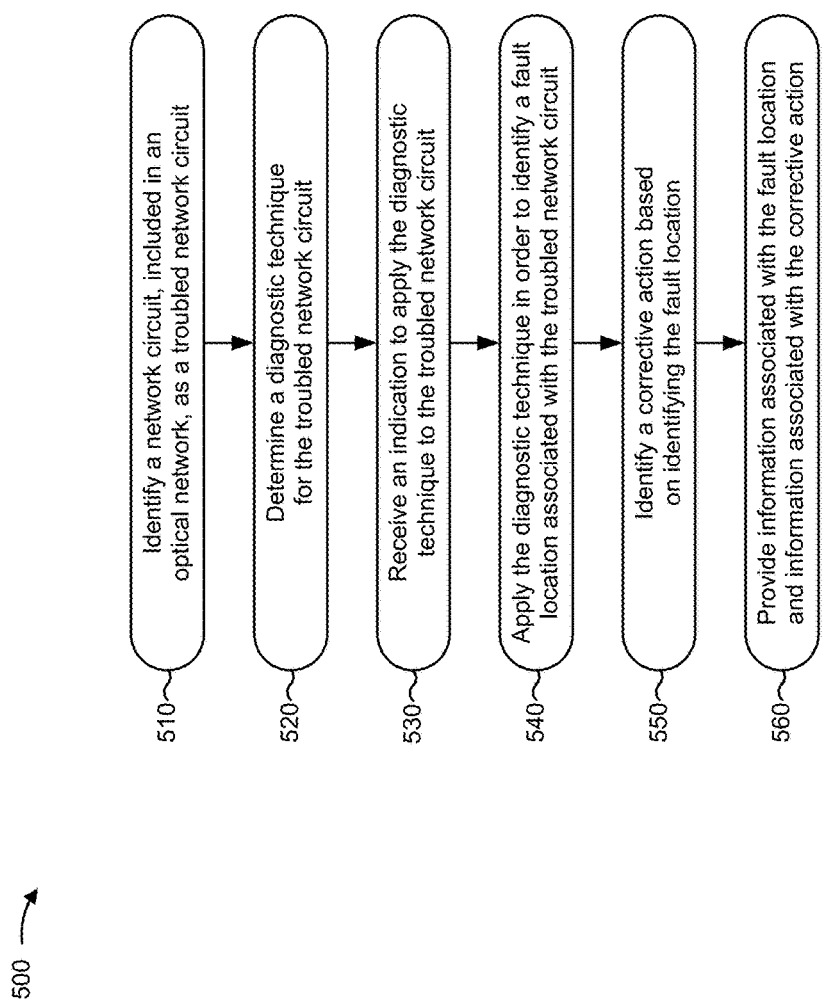

CIRCUIT DIAGNOSTIC MANAGER

BACKGROUND

In optical networks, signals may be transmitted at various wavelengths, with each wavelength corresponding to a transmission channel. Optical links may connect network nodes so that signals may be transmitted throughout the optical network. An optical route may use a series of network nodes and optical links to connect a source of an optical transmission with a destination for the optical transmission.

SUMMARY

According to some possible implementations a device may comprise one or more processors to: receive health information associated with a network circuit included in an optical network, where the health information may include information associated with a level of performance of the network circuit; determine, based on the health information and network circuit information associated with the network circuit, that the network circuit is experiencing a health issue, where the health issue may indicate that the level of performance of the network circuit does not satisfy a threshold level of performance; identify a diagnostic technique to be applied to the network circuit based on determining that the network circuit is experiencing the health issue; automatically and iteratively apply the identified diagnostic technique to the network circuit in order to identify a fault location, where the fault location may identify a location of a fault, within the network circuit, that causes the network circuit to experience the health issue, and where the iteratively applying the diagnostic technique to the network circuit may include repeatedly applying the diagnostic technique to successive portions of the network circuit; determine a corrective action, associated with the network circuit, based on the fault location and the health issue, where the corrective action may include an action to be taken in order to cause the level of performance of the network circuit to satisfy the threshold level of performance; and provide information associated with the corrective action to cause the corrective action to be taken.

According to some possible implementations, a computer-readable medium may store one or more instructions that, when executed by one or more processors, cause the one or more processors to: obtain health information associated with a network circuit included in an optical network, where the health information may include information associated with a level of performance of the network circuit; identify a health issue, associated with the network circuit, based on the health information and network circuit information associated with the network circuit, where the health issue may indicate that the level of performance of the network circuit does not satisfy a threshold level of performance; identify a diagnostic technique to be applied to the network circuit based on identifying the health issue; automatically and iteratively apply the diagnostic technique to the network circuit in order to identify a fault location, where the fault location may identify a point in the network circuit where the health issue is caused, and where the iteratively applying the diagnostic technique to the network circuit may include repeatedly applying the diagnostic technique to successive portions of the network circuit; determine a corrective action, associated with network circuit, based on the fault location and the health issue, where the corrective action may include an action to be taken in order to cause the level of performance of the network circuit to satisfy the threshold level of performance; and provide information associated with the corrective action, where the information associated with the corrective action may include information associated with the fault location, and where the information associated with the corrective action may be provided to cause the corrective action to be taken.

According to some possible implementations, a method may include: receiving, by a diagnostic device, health information associated with a network circuit included in an optical network, where the health information may include information associated with a level of performance of the network circuit; identifying, by the diagnostic device, a health issue associated with the network circuit, where the health issue may indicate that the level of performance of the network circuit does not satisfy a threshold level of performance, and where the health issue may be identified based on the health information and network circuit information associated with the network circuit; determining, by the diagnostic device and based on the identified health issue, a diagnostic technique to be applied to the network circuit; automatically and iteratively applying, by the diagnostic device, the diagnostic technique to the network circuit in order to identify a fault location, where the fault location may identify a location of a fault, within the network circuit, that causes the network circuit to experience the health issue, and where the iteratively applying the diagnostic technique to the network circuit may include repeatedly applying the diagnostic technique to successive portions of the network circuit; determining, by the diagnostic device and based on the fault location and the health issue, a corrective action, where the corrective action may include an action to be taken in order to cause the level of performance of the network circuit to satisfy the threshold level of performance; and providing, by the diagnostic device, information associated with the corrective action to cause the corrective action to be taken.

BRIEF DESCRIPTION OF THE DRAWINGS

FIG. 4 is a flow chart of an example process for receiving and storing network circuit information associated with an optical network;

FIG. 5A is a flow chart of an example process for identifying a troubled network circuit, included in an optical network, and applying a diagnostic technique in order to identify a corrective action to be taken with respect to the troubled network circuit;

DETAILED DESCRIPTION

The following detailed description of example implementations refers to the accompanying drawings. The same reference numbers in different drawings may identify the same or similar elements.

An optical network may include many network circuits (e.g., network paths that allow data to be passed between two or more network devices via optical links). However, a network circuit may be subject to faults that result in health issues (e.g., connectivity errors, signal degrade, etc.) associated with the network circuit. In some cases, a network administrator may need to manually identify a fault location (e.g., at a particular network device, at a particular optical link, etc.) by applying, at various points along the network circuit (e.g., termination points associated with an optical transport network (OTN) framework), one or more diagnostic techniques, such as a test associated with the network circuit, a performance monitoring (PM) information analysis associated with the network circuit, an alarm analysis associated with the network circuit, or the like. In an optical network and/or a network circuit, detection of such a fault may be a time consuming and tedious process. This may lead to an increased cost (e.g., in time, in resources, etc.) associated with restoring service to the optical network.

Implementations described herein relate to a circuit diagnostic manager that may automatically (e.g., without user intervention) detect a troubled network circuit in an optical network, identify and apply an appropriate diagnostic technique to the network circuit in order to identify a location of a fault within the network circuit, and provide a recommended corrective action associated with correcting the fault. In this way, the circuit diagnostic manager may provide for automatic detection, diagnosis, and/or correction of a troubled network circuit in an optical network, thereby reducing a cost (e.g., in man-hours, in network circuit down time, etc.) associated with rectifying the troubled network circuit.

Figure 1A:
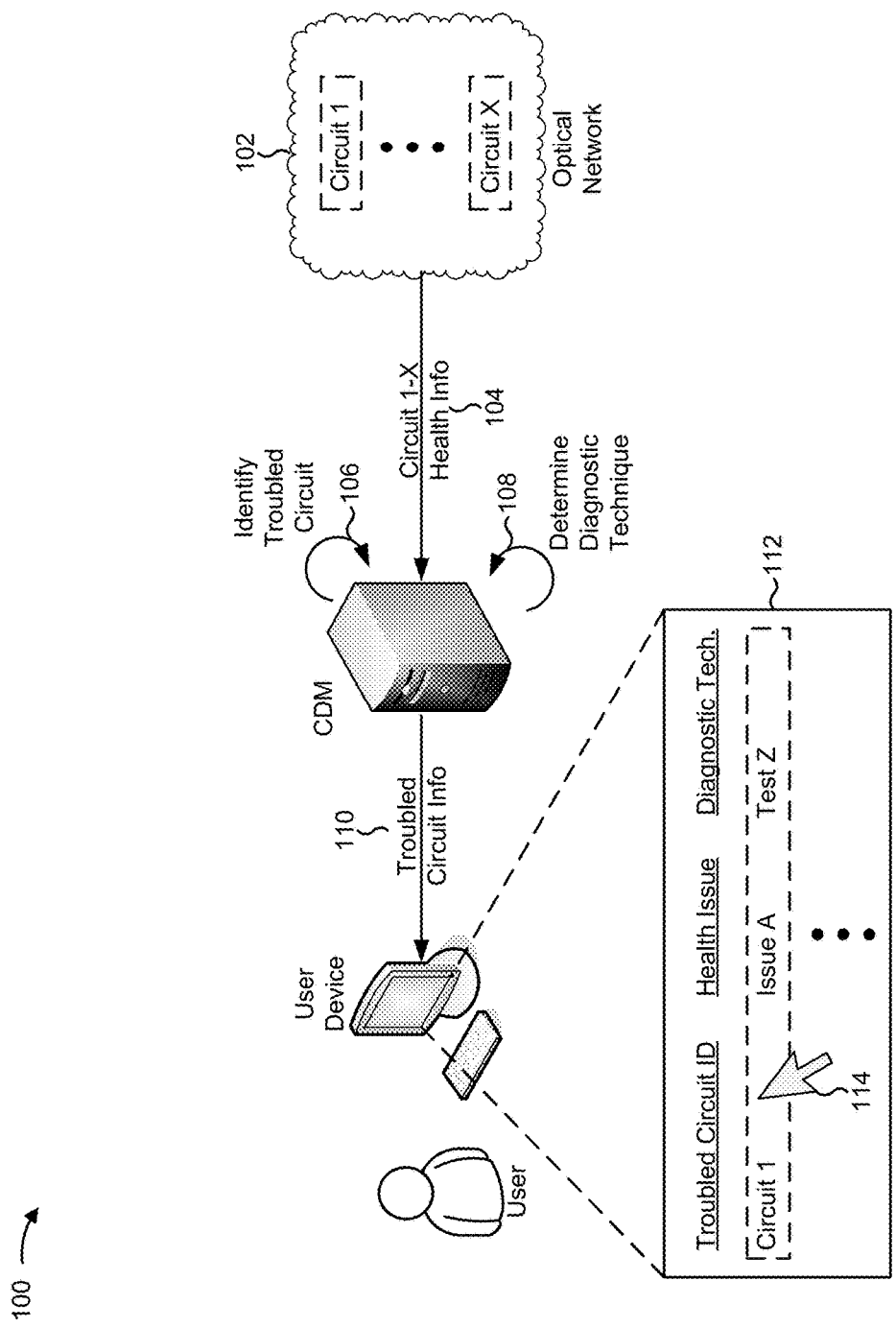
FIGS. 1A and 1B are diagrams of an overview of an example implementation described herein.
Figure 1B:
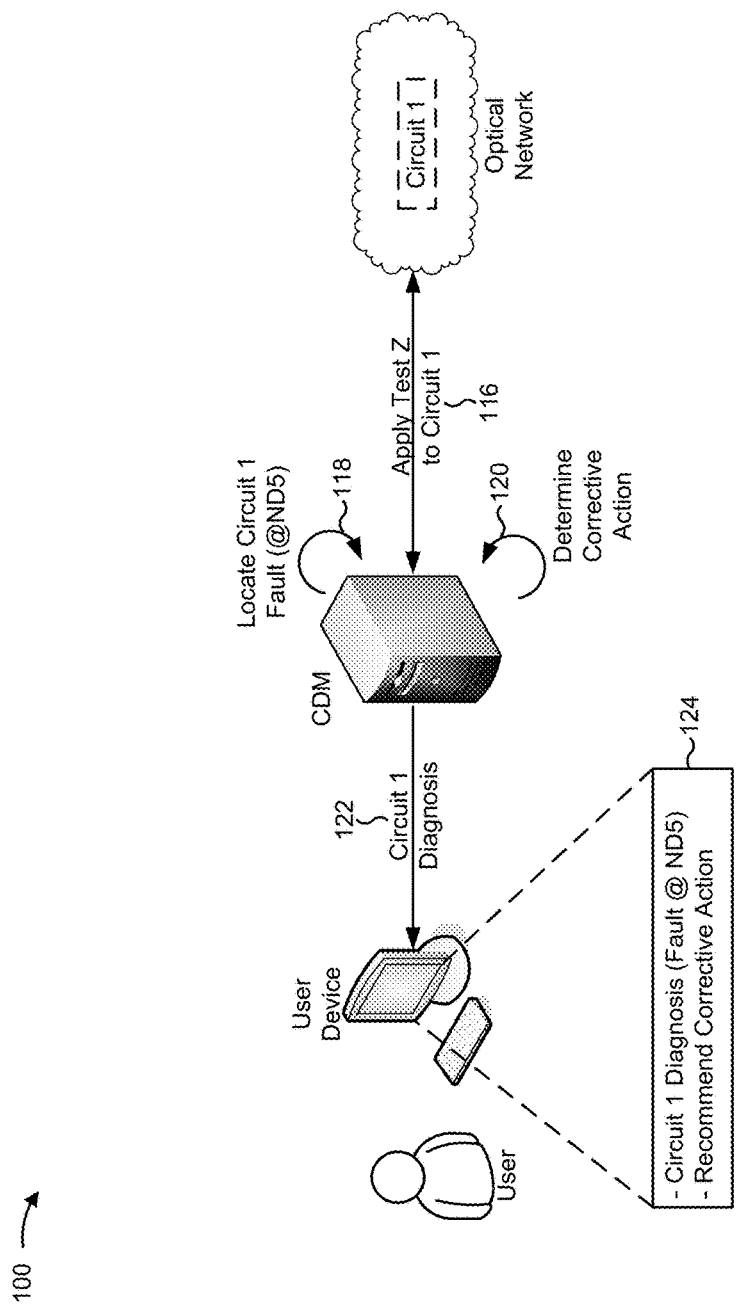

FIGS. 1A and 1B are diagrams of an overview of an example implementation 100 described herein. For the purposes of example implementation 100, and as shown by reference number 102, assume that an optical network includes a group of network circuits (e.g., circuit 1 through circuit X) that connect multiple network devices via optical links. Further, assume that a circuit diagnostic manager (CDM), associated with the optical network, stores and/or has access to information associated with the group of network circuits such that the CDM may identify the network devices included in the network circuit, termination points associated with the network devices, and/or the optical links included in each network circuit.

As shown in FIG. 1A, and by reference number 104, the CDM may receive (e.g., based on a request provided by the CDM, automatically based on a configuration of the network devices, etc.) health information associated with the group of network circuits. In some implementations, health information, associated with a network circuit, may include information associated with a manner in which one or more network devices, included in the network circuit, are operating, such as performance monitoring (PM) information, alarm information, tandem connection monitoring (TCM) information, or another type of information associated with the network circuit. As shown by reference number 106, the CDM may receive the health information associated with the group of network circuits, and may analyze the health information in order to identify one or more health issues being experienced by a network circuit. CDM may identify the network circuit experiencing the one or more health issues as a troubled network circuit. As shown by reference number 108, the CDM may, based on the identified health issues associated with the troubled network circuit, determine a diagnostic technique for the troubled network circuit.

As shown by reference number 110, the CDM may provide, to a user device, information associated with the troubled network circuit (e.g., information that identifies the troubled network circuit, information that identifies the health issue, information that identifies the diagnostic technique, etc.). As shown by reference number 112, the user device may display, to a user, the information associated with the troubled network circuit. As shown by reference number 114, the user may view the information associated with the troubled network circuit, and may select the troubled network circuit for diagnosis. As shown, assume that the user selects circuit 1 that is experiencing health issue A, and the CDM has determined that diagnostic technique Z to be applied to circuit 1 in order to identify a fault location associated with circuit 1.

As shown in FIG. 1B, and by reference number 116, the CDM may, based on receiving the user selection of troubled circuit 1 automatically (e.g., without user intervention) apply diagnostic technique Z to circuit 1 and, as shown by reference number 118, may identify a fault location in circuit 1 (e.g., at a network device identified as ND5) that may be causing the circuit 1 health issue. As shown by reference number 120, the CDM may, based on the identified fault location and/or the health issue, determine a recommended corrective action associated with correcting the circuit 1 fault. As shown by reference number 122, the CDM may provide, to the user device, circuit 1 diagnosis information that includes information associated with the identified fault location and information associated with the recommended corrective action. As shown by reference number 124, the user device may display, to the user, the circuit 1 diagnosis information in order to allow the user to view and/or undertake the recommended corrective action.

In this way, a circuit diagnostic manager may automatically detect a troubled network circuit in an optical network, identify and apply an appropriate diagnostic technique to the network circuit in order to identify a location of a fault within the network circuit, and provide a recommended corrective action associated with correcting the fault.

Figure 2A:
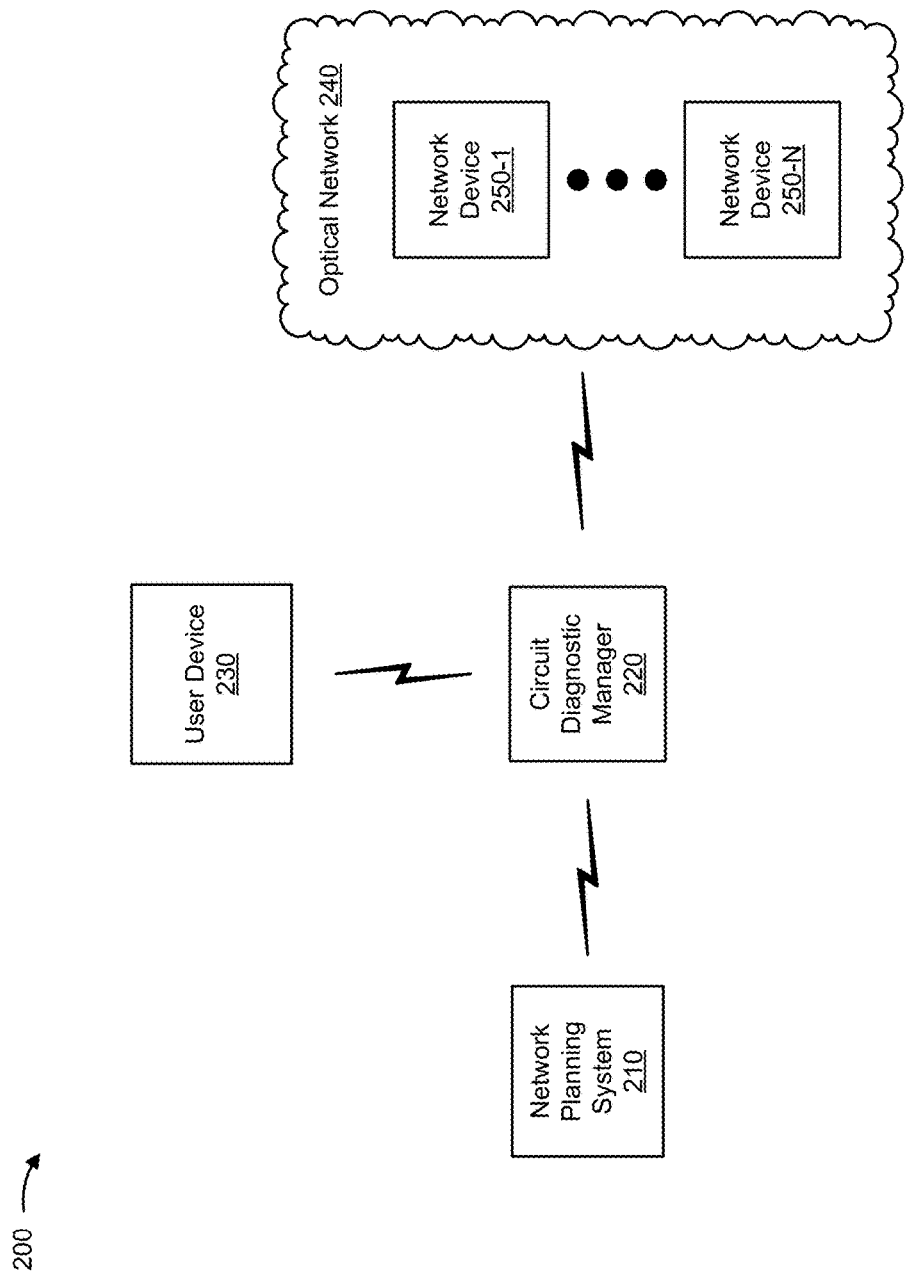
FIG. 2A is a diagram of an example environment in which systems and/or methods, described herein, may be implemented.

FIG. 2A is a diagram of an example environment 200 in which systems and/or methods, described herein, may be implemented. As shown in FIG. 2A, environment 200 may include a network planning system 210, a circuit diagnostic manager (CDM) 220, a user device 230, and an optical network 240, which may include a set of network devices 250-1 through 250-N (N≥1) (hereinafter referred to individually as network device 250, and collectively as network devices 250). Devices of environment 200 may interconnect via wired connections, wireless connections, or a combination of wired and wireless connections.

Network planning system 210 may include one or more devices capable of receiving, generating, storing, processing, and/or providing network circuit information associated with an optical network. For example, network planning system 210 may include a computing device, such as a server or a similar type of device. Network planning system 210 may assist a user in modeling and/or planning an optical network, such as optical network 240. For example, network planning system 210 may assist in modeling and/or planning an optical network configuration, which may include quantities, locations, capacities, parameters, and/or configurations of network devices 250, characteristics and/or configurations (e.g., capacities) of optical links between network devices 250, traffic demands of network devices 250 and/or optical links between network devices 250, and/or any other network information associated with optical network 240 (e.g., optical device configurations, digital device configurations, etc.). Network planning system 210 may provide network circuit information, associated with optical network 240, to CDM 220 so that CDM 220 may identify a troubled network circuit and/or apply a diagnostic technique to the troubled network circuit.

CDM 220 may include one or more devices capable of receiving, generating processing, determining, and/or providing information associated with identifying, diagnosing, testing, and/or repairing a troubled network circuit included in optical network 240. For example, CDM 220 may include a computing device, such as a server, a desktop computer, a laptop computer, or the like. In some implementations, CDM 220 may receive network circuit information (e.g., from one or more devices shown in FIG. 2A), and may manage (e.g., may store, may organize, etc.) the network circuit information using a shared framework that may be used by different applications. Additionally, or alternatively, CDM 220 may provide the network circuit information to another device, such as user device 230, for display via a user interface. In some implementations, CDM 220 may be capable of receiving health information associated with a network circuit, identifying the network circuit as a troubled network circuit based on a health issue associated with the health information, determining and/or applying a diagnostic technique to the network circuit, identifying a fault location associated with the network circuit, and/or determining a recommended corrective action associated with repairing the troubled network circuit.

User device 230 may include one or more devices capable of receiving, generating, storing, processing, and/or providing information associated with a troubled network circuit included in optical network 230. For example, user device 230 may include a computing device, such as a desktop computer, a laptop computer, a tablet computer, a mobile phone (e.g., a smart phone, a radiotelephone, etc.), a handheld computer, or the like. In some implementations, user device 230 may receive information (e.g., network circuit information, health information, diagnosis information, etc.), associated with the troubled network circuit, from another device in environment 200, and may display the information to a user. In some implementations, user device 230 may receive user input associated with identifying, diagnosing, and/or repairing the troubled network circuit, and may provide the user input information to another device (e.g., CDM 220, network device 250, etc.).

Optical network 240 may include any type of network that uses light as a transmission medium. For example, optical network 240 may include a fiber-optic based network, an optical transport network, a light-emitting diode network, a laser diode network, an infrared network, and/or a combination of these or other types of optical networks. Optical network 240 may include one or more optical routes (e.g., optical lightpaths), that may specify a route along which light is carried (e.g., using one or more optical links) between two or more network devices 250. An optical link may include an optical fiber, an optical control channel, an optical data channel, or the like, and may carry an optical channel (e.g., a signal associated with a particular wavelength of light), an optical super-channel, a super-channel group, an optical carrier group, a set of spectral slices, or the like.

Network device 250 may include one or more devices capable of receiving, generating, storing, processing, and/or providing data, carried by an optical signal, via an optical link. For example, network device 250 may include one or more optical data processing and/or optical traffic transfer devices, such as an optical amplifier (e.g., a doped fiber amplifier, an erbium doped fiber amplifier, a Raman amplifier, etc.), an optical add-drop multiplexer ("OADM") (e.g., a reconfigurable optical add-drop multiplexer ("ROADM"), a flexibly reconfigurable optical add-drop multiplexer ("FROADM"), etc.), an optical source device (e.g., a laser source), an optical destination device (e.g., a laser sink), an optical multiplexer, an optical demultiplexer, an optical transmitter, an optical receiver, an optical transceiver, a photonic integrated circuit, an integrated optical circuit, an optical switch, or the like. In some implementations, network device 250 may include one or more optical components. Network device 250 may process and/or transmit an optical signal (e.g., to another network device 250 via an optical link) to deliver the optical signal through optical network 240.

In some implementations, network device 250 may be configured to operate across one or more OTN layers associated with passing information via optical network 240. For example, network device 250 may operate across a client layer (e.g., a layer where service endpoints map to a native client signal via a native client interface, such as a Sonet/SDH/GbE interface), a digital layer (e.g., including one or more OTN layers where a signal may be wrapped or unwrapped with an OTN frame such as an optical transport unit (OTU) frame, an optical data unit (ODU) frame, etc., a layer where multiplexing, switching, adaptation, etc. may occur); and/or an optical layer (e.g., a physical layer where network devices 250 may be connected via optical links).

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

Figure 2B:
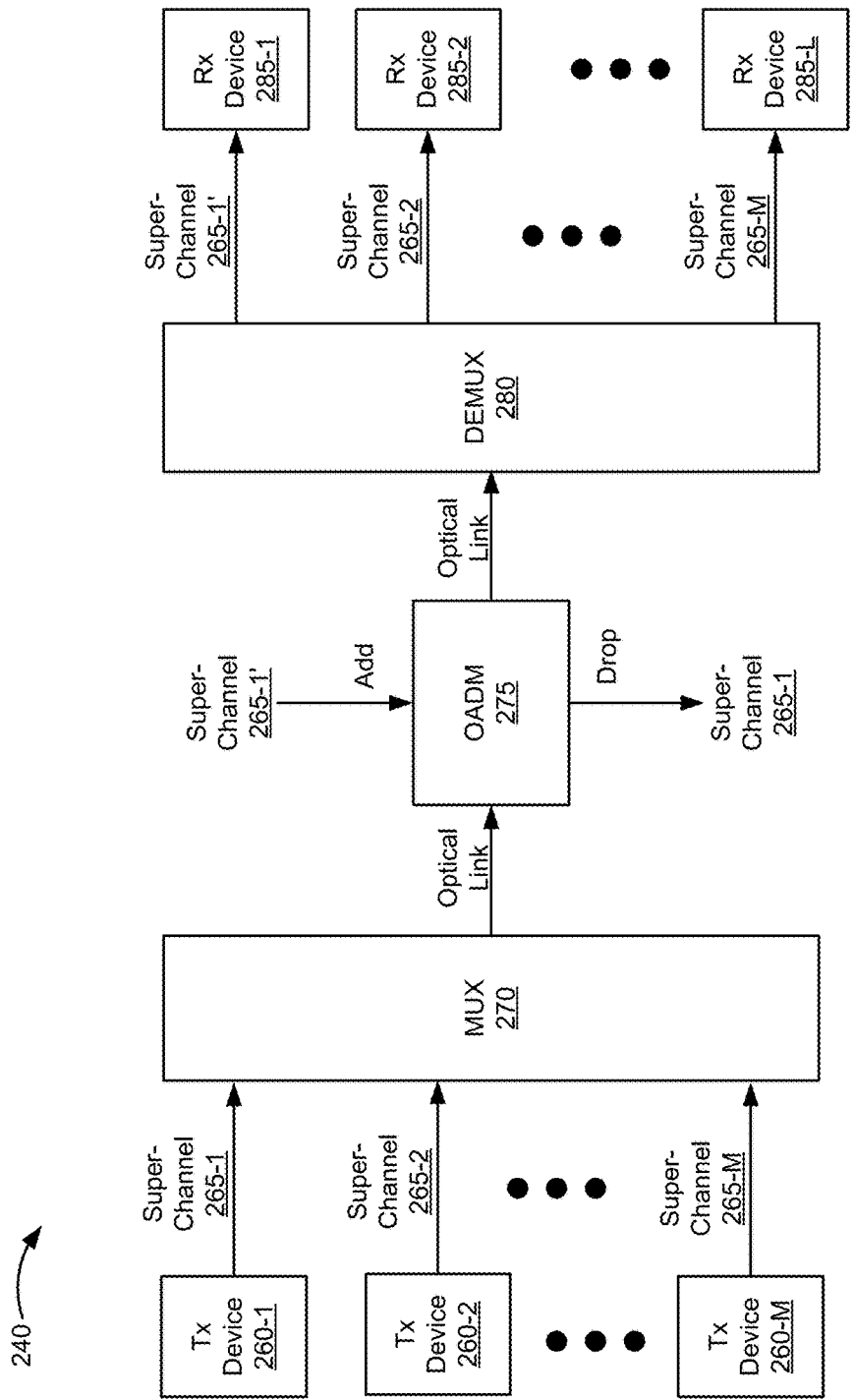
FIG. 2B is a diagram of example devices of an optical network that may be monitored and/or configured according to implementations described herein.

FIG. 2B is a diagram of example devices of optical network 240 that may be monitored and/or configured according to implementations described herein. One or more devices shown in FIG. 2B may operate within optical network 240, and may correspond to one or more network devices 250 and/or one or more optical components of a network device 250. As shown, optical network 240 may include a set of optical transmitter devices 260-1 through 260-M (M≥1) (hereinafter referred to individually as "Tx device 260," and collectively as "Tx devices 260"), a set of super-channels 265-1 through 265-M (M≥1) (hereinafter referred to individually as "super-channel 265," and collectively as "super-channels 265"), a multiplexer ("MUX") 270, an OADM 275, a demultiplexer ("DEMUX") 280, and one or more optical receiver devices 285-1 through 285-L (L≥1) (hereinafter referred to individually as "Rx device 285," and collectively as "Rx devices 285").

Tx device 260 may include, for example, an optical transmitter and/or an optical transceiver that generates an optical signal. For example, Tx device 260 may include one or more integrated circuits, such as a transmitter photonic integrated circuit (PIC), an application specific integrated circuit (ASIC), or the like. In some implementations, Tx device 260 may include a laser associated with a wavelength, a digital signal processor to process digital signals, a digital-to-analog converter to convert the digital signals to analog signals, a modulator to modulate the output of the laser, and/or a multiplexer to combine modulated outputs (e.g., to form a combined output or WDM signal). One or more optical signals may be carried as super-channel 265. In some implementations, a single Tx device 260 may be associated with a single super-channel 265. In some implementations, a single Tx device 260 may be associated with multiple super-channels 265, or multiple Tx devices 260 may be associated with a single super-channel 265.

Super-channel 265 may include multiple channels multiplexed together using wavelength-division multiplexing to increase transmission capacity. Various quantities of channels may be combined into super-channels using various modulation formats to create different super-channel types having different characteristics. Additionally, or alternatively, an optical link may include a super-channel group. A super-channel group may include multiple super-channels multiplexed together using wavelength-division multiplexing to increase transmission capacity.

Multiplexer 270 may include, for example, an optical multiplexer (e.g., an arrayed waveguide grating) that combines multiple input super-channels 265 for transmission over an output fiber. For example, multiplexer 270 may combine super-channels 265-1 through 265-M, and may provide the combined super-channels 265 to OADM 275 via an optical link (e.g., a fiber).

OADM 275 may include, for example, a ROADM, a FROADM, or the like. OADM 275 may multiplex, de-multiplex, add, drop, and/or route multiple super-channels 265 into and/or out of a fiber (e.g., a single mode fiber). As illustrated, OADM 275 may drop super-channel 265-1 from a fiber, and may allow super-channels 265-2 through 265-M to continue propagating toward Rx device 285. Dropped super-channel 265-1 may be provided to a device (not shown) that may demodulate and/or otherwise process super-channel 265-1 to output the data stream carried by super-channel 265-1. As illustrated, super-channel 265-1 may be provisioned for transmission from Tx device 260-1 to OADM 275, where super-channel 265-1 may be dropped. As further shown, OADM 275 may add super-channel 265-1' to the fiber. Super-channel 265-1' may include one or more optical channels at the same or substantially the same wavelengths as super-channel 265-1. Super-channel 265-1' and super-channels 265-2 through 265-M may propagate to demultiplexer 280.

Demultiplexer 280 may include, for example, an optical de-multiplexer (e.g., an arrayed waveguide grating) that separates multiple super-channels 265 carried over an input fiber. For example, demultiplexer 280 may separate super-channels 265-1' and super-channels 265-2 through 265-M, and may provide each super-channel 265 to a corresponding Rx device 285.

Rx device 285 may include, for example, an optical receiver and/or an optical transceiver that receives an optical signal. For example, Rx device 285 may include one or more integrated circuits, such as a receiver PIC, an ASIC, or the like. In some implementations, Rx device 285 may include a demultiplexer to receive a combined signal and demultiplex the combined signal into individual optical signals, a photodetector to convert an optical signal to a voltage signal, an analog-to-digital converter to convert voltage signals to digital signals, and/or a digital signal processor to process the digital signals. One or more optical signals may be received by Rx device 285 via super-channel 265. Rx device 285 may convert a super-channel 265 into one or more electrical signals, which may be processed to output information associated with each data stream carried by an optical channel included in super-channel 265. In some implementations, a single Rx device 285 may be associated with a single super-channel 265. In some implementations, a single Rx device 285 may be associated with multiple super-channels 265, or multiple Rx devices 285 may be associated with a single super-channel 265.

One or more devices shown in FIG. 2B may be an network device 250. In some implementations, a combination of devices shown in FIG. 2B may be a network device 250. For example, Tx devices 260-1 through 260-M and multiplexer 270 may be a network device 250 corresponding to a transmitter device. As another example, Rx devices 285-1 through 285-L and demultiplexer 280 may be a network device 250 corresponding to a receiver device.

The number and arrangement of devices shown in FIG. 2B are provided as an example. In practice, there may be additional devices, fewer devices, different devices, or differently arranged devices, included in optical network 240, than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices shown in FIG. 2B may perform one or more functions described as being performed by another set of devices shown in FIG. 2B.

Figure 3:
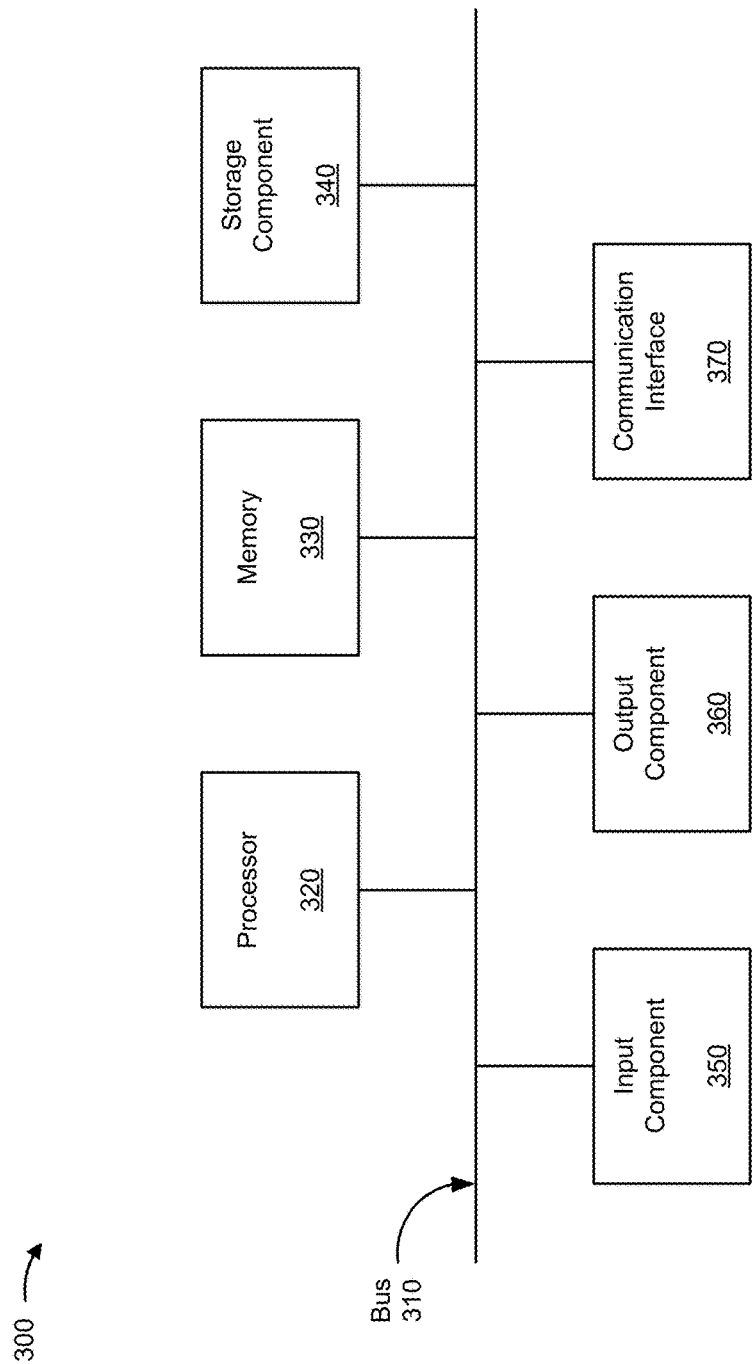
FIG. 3 is a diagram of example components of one or more devices and/or systems of FIG. 2A and/or FIG. 2B.

FIG. 3 is a diagram of example components of a device 300. Device 300 may correspond to network planning system 210, CDM 220, and/or user device 230. In some implementations, network planning system 210, CDM 220, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving and storing network circuit information associated with an optical network. In some implementations, one or more process blocks of FIG. 4 may be performed by CDM 220. In some implementations, one or more process blocks of FIG. 4 may be performed by another device or a group of devices separate from or including CDM 220, such as network planning system 210, user device 230, and/or network device 250.

As shown in FIG. 4, process 400 may include receiving network circuit information associated with an optical network (block 410). For example, CDM 220 may receive network circuit information (e.g., from network planning system 210, network device 250, etc.) associated with optical network 240. In some implementations, CDM 220 may request and/or receive the network circuit information on a periodic basis (e.g., every thirty minutes, every five hours, every day, every week, etc.). Additionally, or alternatively, CDM 220 may request and/or receive the network circuit information based on input received from a user (e.g., user input associated with configuring and/or creating a network circuit). Additionally, or alternatively, network planning system 210, user device 230, and/or network device 250 may automatically provide the network circuit information to CDM 220 (e.g., on a periodic basis, based on creation of a network circuit, when a network circuit is modified, etc.).

A network circuit may include a path in optical network 250 that includes two or more network devices 250 (e.g., including one or more layers associated with the two or more network device 250) and one or more optical links (e.g., between the two or more network devices 250). Network circuit information may include information that describes a network circuit included in optical network 240. For example, the network circuit information may include information that identifies the network circuit (e.g., a circuit name, a circuit identification number, etc.), information that identifies one or more network devices 250 included in the network circuit (e.g., a device name, a device identification number, etc.), information that identifies one or more optical links included in the network circuit (e.g., an optical link identifier, information associated with endpoints of an optical link between network devices 250, etc.), information associated with a network hop included in the network circuit (e.g., a network hop between two OTN layers associated with within a single network device 250, a network hop between two network devices 250 on an OTN layer, etc.), layer information associated with the network circuit (e.g., information that identifies one or more OTN layers across which network devices 250 included the network circuit operate), information associated with a carrier rate associated with the network circuit (e.g., 100 gigabit Ethernet (GbE), optical carrier rate 192 (OC-192), optical transport unit 2 (OTU2), etc.), or another type of information associated with the network circuit.

In some implementations, CDM 220 may use the network circuit information to identify the network circuit as a troubled network circuit, determine a diagnostic technique to be applied to the troubled network circuit, and/or apply the diagnostic technique to the troubled network circuit, as described below.

As further shown in FIG. 4, process 400 may include storing the network circuit information (block 420). For example, CDM 220 may store the network circuit information in a memory accessible by CDM 220 and/or user device 230. In some implementations, CDM 220 may store the network circuit information in a data structure. CDM 220 may organize the data structure such that the network circuit information may be used by multiple applications, as described in more detail elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5A is a flow chart of an example process 500 for identifying a troubled network circuit, included in an optical network, and applying a diagnostic technique in order to identify a corrective action to be taken with respect to the troubled network circuit. In some implementations, one or more process blocks of FIG. 5A may be performed by CDM 220. In some implementations, one or more process blocks of FIG. 5A may be performed by another device or a group of devices separate from or including CDM 220, such as network planning system 210, user device 230, and/or network device 250.

As shown in FIG. 5A, process 500 may include identifying a network circuit, included in an optical network, as a troubled network circuit (block 510). For example, CDM 220 may identify a network circuit, included in optical network 240, as a troubled network circuit. In some implementations, CDM 220 may identify the network circuit as a troubled network circuit when CDM 220 receives health information, associated with the network circuit, as described below. Additionally, or alternatively, CDM 220 may identify the troubled network circuit when CDM 220 receives an indication (e.g., based on user input, based on a configuration of CDM 220, etc.) that CDM 220 is to identify the troubled network circuit, as described below.

A troubled network circuit may include a network circuit, included in optical network 240, that is experiencing a health issue. A health issue may include an issue, associated with the network circuit, that causes the network circuit to achieve a level of performance that is less than a threshold level of performance (e.g., an expected level of performance, an identified level of performance, a configured level of performance, a desired level of performance, etc.), such as a connectivity error, a signal degrade, an alarm condition, or the like. In some implementations, the threshold may be a static threshold (e.g., a PM threshold stored or accessible by CDM 220, a user defined PM threshold). Additionally, or alternatively, the threshold may be a dynamic threshold (e.g., a threshold determined based on a PM threshold algorithm, based on a change in PM data over a period of time, etc.). In some implementations, CDM 220 may identify the network circuit as a troubled network circuit by detecting a health issue based on health information associated with the network circuit.

In some implementations, CDM 220 may detect the health issue based on the health information. For example, CDM 220 may receive, from one or more network devices 250 included in the network circuit, health information associated with the network circuit. In some implementations, health information, associated with a network circuit, may include information associated with a level of performance of the network circuit, such as PM information (e.g., block error information, block error ratio information, errored second information, errored second ratio information, failure count information, severely errored second information, severely errored second ratio information, unavailable second information, bit error information, etc.), TCM information, alarm condition information, or the like.

In some implementations, CDM 220 may analyze the health information, may detect a health issue being experienced by the network circuit, and may identify the network circuit as a troubled network circuit based on detecting the health issue. As an example, CDM 220 may receive PM information associated with the network circuit, and may determine, based on unequal error block information (e.g., in a network circuit ingress direction as compared to a network circuit egress direction), that the network circuit is experiencing a signal degrade issue. As another example, CDM 220 may receive alarm information indicating a network break fault at a first endpoint of the network circuit. Here, CDM 220 may detect a connectivity error within the network circuit if CDM 220 does not receive similar alarm condition information associated with a second endpoint of the network circuit (i.e., the connectivity error may be occurring between the two endpoints of the network circuit).

Additionally, or alternatively, CDM 220 may detect the health issue based on a health issue rule stored or accessible by CDM 220. For example, CDM 220 may store information that identifies a threshold (e.g., a minimum, a maximum, a range, etc.) associated with a particular type of PM information. Here, CDM 220 may identify corresponding PM information, of the particular type of PM information and received from network device 250 included in the network circuit, and may determine whether the corresponding PM information satisfies the threshold. If the corresponding PM information satisfies the threshold, then CDM 220 may not detect a health issue (i.e., the network circuit may not be identified as a troubled network circuit). Alternatively, if the corresponding PM information does not satisfy the threshold, then CDM 220 may detect a health issue (e.g., corresponding to the PM information), and may identify the network circuit as a troubled network circuit. In some implementations, the health issue rule may be a static rule stored or accessible by CDM 220. Alternatively, the health issue rule may be a dynamic rule that may be updated based on a configuration associated with CDM 220.

Additionally, or alternatively, CDM 220 may detect the health issue based on a health issue algorithm stored or accessible by CDM 220. For example, CDM 220 may provide, as inputs to the health issue algorithm, the health information (e.g., one or more portions of PM information, alarm condition information, etc.) associated with the network circuit, may receive, as an output, information that identifies a health issue being experienced by the network circuit, and may identify the network circuit as a troubled network circuit based on the identified health issue.

Additionally, or alternatively, CDM 220 may identify the network circuit as a troubled network circuit in another manner, such as based on user input that identifies a health issue being experienced by the network circuit and/or information that otherwise indicates that the network circuit is a troubled network circuit. In some implementations, CDM 220 may identify multiple troubled network circuits (e.g., when CDM 220 receives health information associated with multiple network circuits).

In some implementations, CDM 220 may (e.g., automatically) identify the network circuit as a troubled network circuit on a periodic basis. For example, CDM 220 may receive health information, associated with the network circuit, at a particular interval of time (e.g., every five minutes, every one hour, every seven days, etc.) and may determine whether the network circuit is a troubled network circuit (e.g., by attempting to detect a health issue) at each interval of time. Additionally, or alternatively, CDM 220 may (e.g., automatically) identify the network circuit as a troubled network circuit when CDM 220 receives the health information (e.g., when CDM 220 is configured to determine whether a network circuit is a troubled network circuit immediately after CDM 220 receives health information associated with the network circuit). Additionally, or alternatively, CDM 220 may identify the network circuit as a troubled network circuit in an on-demand manner (e.g., when a user requests, via user device 230, that CDM 220 determine whether the network circuit is a troubled network circuit).

Figure 5B:
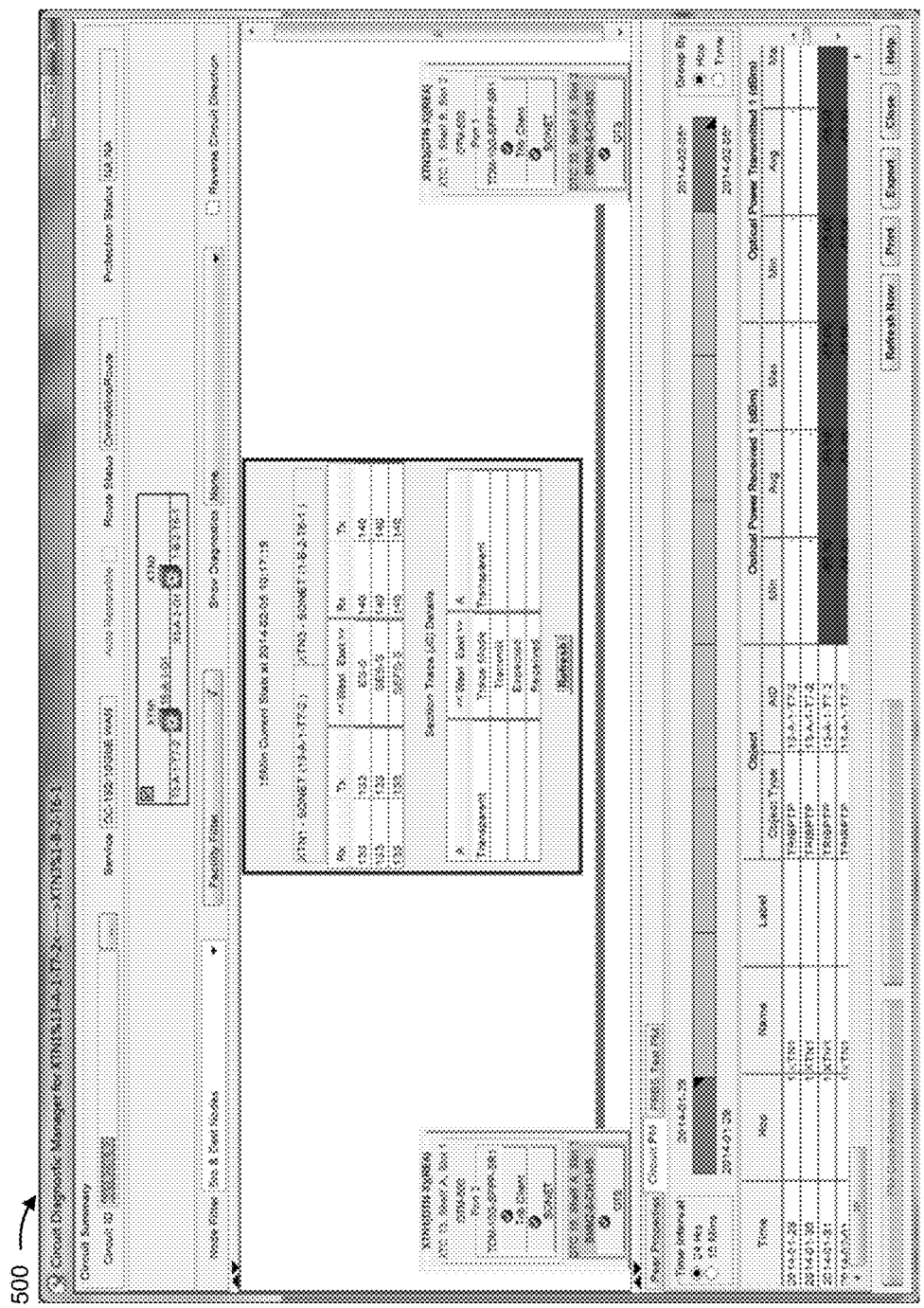
FIG. 5B is an example user interface that displays network circuit information and health information associated with a network circuit.

In some implementations, CDM 220 may provide, to user device 230, the network circuit information associated with the network circuit and the health information associated with the network circuit for display to the user. FIG. 5B shows an example user interface that displays network circuit information and health information associated with a network circuit. As shown in FIG. 5B, the user interface may include information associated with network devices 250 included in the network circuit, information associated with layers across which network device 250 operates, information associated with a link included in the network circuit, health information associated with the network circuit, or the like. As shown in the lower portion of FIG. 5B, in some implementations, the user interface may include previous health information associated with the network circuit over some period of time. In some implementations, the user may select (e.g., via a drop down menu) a network circuit to be displayed via the user interface.

Returning to FIG. 5A, process 500 may include determining a diagnostic technique for the troubled network circuit (block 520). For example, CDM 220 may determine a diagnostic technique for the troubled network circuit. In some implementations, CDM 220 may determine the diagnostic technique after CDM 220 identifies the network circuit as a troubled network circuit. Additionally, or alternatively, CDM 220 may identify the diagnostic technique when CDM 220 receives information indicating that CDM 220 is to determine the diagnostic technique.

A diagnostic technique may include a technique that may be applied to the network circuit in order to identify a location of a fault, associated with the network circuit, that may be causing the health issue. For example, the diagnostic technique may include a pseudo random bit sequence (PRBS) test, a trail trace identifier test (TTI), a TCM test, a PM information analysis, or the like.

In some implementations, CDM 220 may determine the diagnostic technique based on the health issue associated with the network circuit. For example, if CDM 220 detects that a network circuit is experiencing a signal degrade issue, then CDM 220 may determine a PRBS test as the diagnostic technique for the network circuit (e.g., when CDM 220 stores information indicating that a PRBS test is to be applied to a network circuit experiencing signal degrade).

Additionally, or alternatively, CDM 220 may determine the diagnostic technique based on the network circuit information. For example, assume that CDM 220 detects that a network circuit is experiencing a connectivity error. Further, assume that CDM 220 determines (e.g., based on the network circuit information) that a first endpoint of the network circuit lies at a client layer is associated with a mapping a non-OTN client (e.g., Sonet, SDH, GbE) signal to an OTN client signal in order to allow information to be wrapped by an OTN wrapper, and that a second endpoint of the network circuit is similarly associated with the non-OTN client. Here, since the health issue is a connectivity error and since the network circuit endpoints are associated with the non-OTN client, as described above, CDM 220 may determine (e.g., based on information stored by CDM 220) a TTI test as the diagnostic technique for the network circuit (e.g., when CDM 220 stores information indicating that a TTI test is to be applied to a network circuit, associated with non-OTN client mapping, that is experiencing a connectivity error).

As another example, assume that CDM 220 detects that a network circuit is experiencing a connectivity error. Further, assume that CDM 220 determines (e.g., based on the network circuit information) that an endpoint of the network circuit is associated with an OTN client that is configured to act in a switching mode, and that a second endpoint of the network circuit is similarly associated with the OTN client in the switching mode. Here, since the health issue is a connectivity error and since the network circuit endpoints are associated with an OTN client (e.g., rather than a non-OTN client), as described above, CDM 220 may determine a TCM test as the diagnostic technique for the network circuit (e.g., when CDM 220 stores information indicating that a TCM test is to be applied to a network circuit, associated with an OTN client in switching mode, that is experiencing a connectivity error).

In some implementations, CDM 220 may determine the diagnostic information in another manner, such as based on alarm information associated with the network circuit. For example, assume that CDM 220 receives alarm information, associated with the network circuit, indicating that the network circuit is experiencing a health issue related to a performance metric (e.g., signal power) and based on a performance metric threshold (e.g., a minimum allowable signal power, a maximum allowable signal power, etc.). Here, CDM 220 may determine, based on the alarm information associated with the performance metric, the diagnostic technique as a PM information analysis associated with the network circuit.

In some implementations, CDM 220 may determine the diagnostic technique based on a diagnostic test rule stored or accessible by CDM 220, as described in the above examples. Additionally, or alternatively, CDM 220 may determine the diagnostic technique based on a diagnostic algorithm stored or accessible by CDM 220. For example, CDM 220 may provide, as inputs to the diagnostic technique algorithm, information associated with the health issue, the network circuit information, and/or the health information (e.g., one or more portions of the PM information, the alarm condition information, etc.), may receive, as an output, information that identifies a diagnostic technique for the network circuit, and may determine the diagnostic technique based on the received output.

In some implementations, CDM 220 may determine the diagnostic technique using a look-up table (e.g., when CDM 220 stores or has access to a look-up table that identifies a diagnostic technique that is to be performed for a particular health issue, a particular network circuit, particular network circuit information, etc.). Additionally, or alternatively, CDM 220 may determine the diagnostic technique based on a diagnostic technique algorithm. For example, CDM 220 may provide, as an input, the health issue, the network circuit information, or the like, and may receive, as an output, information that identifies the diagnostic technique (e.g., information that identifies a particular diagnostic technique, information that identifies multiple diagnostic techniques, etc.). In some implementations, CDM 220 may determine a set of probabilities, corresponding to multiple diagnostic techniques, that identify probabilities that the multiple diagnostic techniques will determine the location of the fault. In such an example, CDM 220 may select a diagnostic technique, of the multiple diagnostic techniques, based on the set probabilities (e.g., a diagnostic technique with a highest probability, a diagnostic technique with a probability that satisfies a probability threshold, etc.).

Additionally, or alternatively, CDM 220 may determine the diagnostic technique in another manner, such as based on historical information, associated with diagnostic techniques determined at an earlier time, stored or accessible CDM 220.

In some implementations, after determining the diagnostic technique, CDM 220 may provide information associated with the troubled network circuit, information associated with the health issue, and information associated with the diagnostic technique (herein referred to as troubled circuit information). For example, CDM 220 may provide the troubled circuit information to user device 230 in order to allow user device 230 to display the troubled circuit information for viewing by a user. In some implementations, user device 230 may display the troubled circuit information, and the user may select, via a user interface of user device 230, the troubled network circuit for diagnosis, as described below.

In some implementations, CDM 220 may determine multiple diagnostic techniques for the troubled network circuit (i.e., CDM 220 may determine multiple diagnostic techniques for a single troubled network circuit). Additionally, or alternatively, CDM 220 may identify multiple diagnostic techniques for the troubled network circuit, and may identify an order in which the multiple diagnostic techniques are to be performed. Additionally, or alternatively, CDM 220 may determine multiple diagnostic techniques for multiple corresponding troubled network circuits (i.e., CDM 220 may determine multiple troubled network circuits and may determine a diagnostic technique for each troubled network circuit), and may provide troubled circuit information associated with the multiple network circuits.

As further shown in FIG. 5A, process 500 may include receiving an indication to apply the diagnostic technique to the troubled network circuit (block 530). For example, CDM 220 may receive an indication to apply the diagnostic technique to the troubled network circuit. In some implementations, CDM 220 may receive the indication after CDM 220 determines the diagnostic technique for the troubled network circuit. Additionally, or alternatively, CDM 220 may receive the indication after CDM 220 provides the troubled circuit information (e.g., to user device 230).

In some implementations, CDM 220 may receive the indication based on user input. For example, CDM 220 may provide, to user device 230, troubled circuit information associated with the network circuit. Here, user device 230 may provide, for display to the user, the troubled circuit information, and the user may provide, via user input, the indication that the diagnostic technique is to be applied to the troubled network circuit. User device 230 may then provide the indication to CDM 220. In this way, the user may view information associated with one or more troubled network circuits, and may select a particular network circuit for diagnosis. In some implementations, the user may also select (e.g., via a user interface of user device 230) the diagnostic technique (e.g., when CDM 220 determines multiple diagnostic techniques).

Additionally, or alternatively, CDM 220 may receive the indication based on a configuration of CDM 220. For example, in some implementations, CDM 220 may be configured to automatically (e.g., without user intervention) apply the diagnostic technique after CDM 220 determines the diagnostic technique. In this example, CDM 220 may automatically generate the indication after determining the diagnostic technique. In some implementations, CDM 220 may be configured to apply diagnostic techniques to corresponding troubled network circuits (e.g., concurrently, in a particular order, such as based on health issue severity, based on an order of identification as a troubled network circuit, etc.).

As further shown in FIG. 5A, process 500 may include applying the diagnostic technique in order to identify a fault location associated with the troubled network circuit (block 540). For example, CDM 220 may apply the diagnostic technique in order to identify a fault location associated with the troubled network circuit. In some implementations, CDM 220 may apply the diagnostic technique based on receiving the indication that CDM 220 is to apply the diagnostic technique to the troubled network circuit.

In some implementations, CDM 220 may apply the diagnostic technique based on one or more network hops, included in the network circuit, in order to identify the fault location that may be causing the health issue associated with the network circuit. A network hop may include a portion of the network circuit that lies between two layers (e.g., a client layer and a digital layer), a portion of the network circuit that lies between two network devices 350 (e.g., on a single layer), or the like.

In some implementations, the network hop may be between layers within network device 250 included in the network circuit. For example, the network hop may be a portion of the network circuit between a first OTN layer (e.g., a client layer), associated with a particular network device 250, and a second OTN layer (e.g., a digital layer) on which the particular network device 250 operates. Additionally, or alternatively, the network hop may be between two network devices 250 included in the network circuit. For example, the network hop may be a portion of the network circuit across an optical link (e.g., on the digital layer) between a first network device 250 and a second network device 250 included in the network circuit.

In some implementations, CDM 220 may apply the diagnostic technique at successive network hops, along the network circuit, in order to identify the fault location. For example, CDM 220 may apply the diagnostic technique at a first network hop, may not detect a fault associated with the first network hop, may apply the diagnostic technique at a second (e.g., subsequent) network hop, and may detect a fault associated with the second network hop (e.g., at a particular network device 250, at a particular layer on which network device 250 operates, across a particular link between two network devices 250, etc.). In other words, CDM 220 may apply the diagnostic technique at subsequent network hops until CDM 220 identifies a fault location that may be causing the health issue associated with the network circuit. Additionally, or alternatively, CDM 220 may apply the diagnostic technique at successive OTN layers (or successive sub-layers of an OTN layer) associated with the network circuit.

In some implementations, CDM 220 may automatically (e.g., without user intervention) apply the diagnostic technique to the network circuit. For example, CDM 220 may automatically apply the diagnostic technique to one or more network hops included in the network circuit without input and/or direction from a user.

Additionally, or alternatively, CDM 220 may iteratively apply the diagnostic technique to the network circuit (e.g., CDM 220 may repeatedly apply the diagnostic technique to successive network hops included in the network circuit). For example, CDM 220 may apply the diagnostic technique to a first network hop included in the network circuit first, and may determine that the fault location does not lie on the first network hop. CDM 220 may then apply the diagnostic technique to a second network hop included in the network circuit second (e.g., a subsequent network hop), and may determine that the fault location does not lie on the second network hop. CDM 220 may continue applying the diagnostic technique to successive network hops until CDM 220 identifies a network hop on which the fault location lies. In this way, CDM 220 may iteratively apply the diagnostic technique to the network circuit.

In some implementations, CDM 220 may automatically and iteratively apply the diagnostic technique to the network circuit (e.g., such that CDM 220 iteratively applies the diagnostic technique, without user intervention, in order to identify the fault location).

Additionally, or alternatively, CDM 220 may apply the diagnostic technique based on the health information associated with the network circuit. For example, if CDM 220 determines the diagnostic technique as a PM analysis (e.g., based on alarm information received by CDM 220), then CDM 220 may analyze PM information, associated with the network circuit and a time corresponding to the alarm information, in order to identify abnormal (e.g., above a threshold, below a threshold, outside of a range, etc.) PM values associated with the network circuit. Here, CDM 220 may identify a fault location based on the PM analysis.

In some implementations, CDM 220 may provide information associated with the PM analysis for display to the user (e.g., via user device 230). In some implementations, the information associated with the PM analysis may be provided such that the user may readily identify the abnormal PM values (e.g., by color coding the abnormal PM values in a table, etc.). Additionally, or alternatively, the information associated with the PM analysis may be provided such that the user may interact with the PM analysis information.

In this way, CDM 220 may automatically identify a fault location along the network circuit. Example implementations showing a manner in which CDM 220 may apply a variety of diagnostic techniques are described below.

As further shown in FIG. 5A, process 500 may include identifying a corrective action based on identifying the fault location (block 550). For example, CDM 220 may identify a corrective action based on identifying the fault location. In some implementations, CDM 220 may identify the corrective action after CDM 220 identifies the fault location. Additionally, or alternatively, CDM 220 may identify the corrective action when CDM 220 receives information indicating that CDM 220 is to identify the corrective action.

A corrective action may include an action that, if taken, may resolve the health issue associated with the network circuit. In some implementations, the corrective action may be an action associated with an optical link (e.g., cleaning an optical fiber, replacing an optical fiber, etc.), an action associated with network device 250 (e.g., modifying a configuration, adjusting a parameter, replacing a component, etc.), or the like. In some implementations, CDM 220 may identify the corrective action based on the fault location. For example, CDM 220 may store or have access to information that identifies a first corrective action that is to be taken when the fault location lies across an optical link, and information that identifies a second corrective action that is to be taken when the fault location lies at a network hop within network device 250. In this example, CDM 220 may identify the corrective action based on whether the fault location lies across an optical link or within network device 250. Additionally, or alternatively, CDM 220 may identify the corrective action based on the health issue. For example, CDM 220 may store or have access to information that identifies a corrective action that is to be taken with respect to the health issue experienced by the network circuit. In some implementations, CDM 220 may identify multiple corrective actions.

As further shown in FIG. 5A, process 500 may include providing information associated with the fault location and information associated with the corrective action (block 560). For example, CDM 220 may provide information associated with the fault location and information associated with the corrective action (herein referred to as diagnosis information). In some implementations, CDM 220 may provide the diagnosis information after CDM 220 identifies the corrective action.

In some implementations, CDM 220 may provide the diagnosis information in order to cause the corrective action to be taken at the fault location. For example, CDM 220 may provide the diagnosis information to user device 230. User device 230 may provide, for display to the user, the diagnosis information such that the user may take the corrective action in order to resolve the health issue associated with the network circuit. As another example, CDM 220 may provide the diagnosis information to another device (e.g., network planning system 210, network device 250), in order to cause the other device to (e.g., automatically) take the corrective action.

In some implementations, CDM 220 may reapply the diagnostic technique, after the corrective action has been taken, in order to ensure that the health issue has been resolved and/or in order to determine whether another fault exists along the network circuit that may be causing the health issue. For example, the user may take the corrective action, and may provide, to CDM 220 via user device 230, an indication that the corrective action has been taken. Here, CDM 220 may reapply the diagnostic technique to the network circuit in order to determine whether another fault exists along the network circuit. In some implementations, CDM 220 may reapply the diagnostic technique based on an indication from the user (e.g., when the user wishes for CDM 220 to reapply the diagnostic technique). Additionally, or alternatively, CDM 220 may automatically reapply the diagnostic technique (e.g., when CDM 220 is configured to reapply the diagnostic technique after the corrective action has been taken).

Although FIG. 5A shows example blocks of process 500, in some implementations, process 500 may include additional blocks, fewer blocks, different blocks, or differently arranged blocks than those depicted in FIG. 5A. Additionally, or alternatively, two or more of the blocks of process 500 may be performed in parallel.

FIGS. 6A-6J are diagrams of an example implementation 600 relating to the example process shown in FIG. 5A. FIGS. 6A-6J show an example of identifying a troubled network circuit, included in an optical network, and applying a diagnostic technique in order to identify a corrective action to be taken with respect to the troubled network circuit. For the purposes of example implementation 600, assume that CDM 220 (e.g., CDM1) stores or has access to network circuit information, associated with each network circuit included in the optical network (e.g., circuit C1 through circuit CX), that includes information that identifies each network circuit, information that identifies network devices 250 included in each network circuit, information that identifies links included in each network circuit, information associated with layers at which network devices 250 included in the each network circuit operate, and information associated with a carrier rate associated with each network circuit.

Figure 6A:
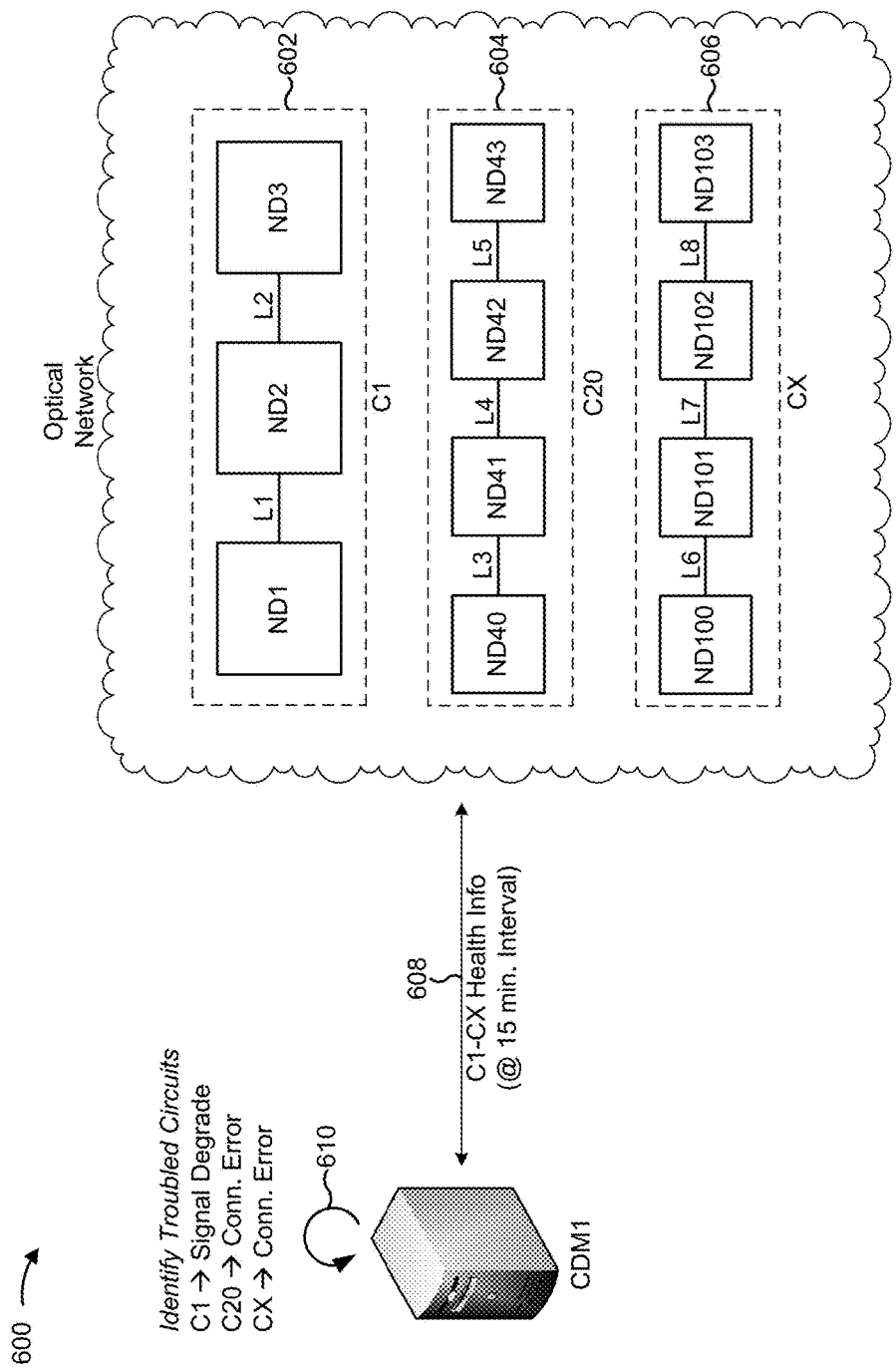
FIGS. 6A-6J are diagrams of an example implementation relating to the example process shown in FIG. 6.

As shown in FIG. 6A, and by reference number 602, assume that a first network circuit included in the optical network (e.g., C1) includes a first group of network devices 250 (e.g., ND1, ND2, and ND3) connected by a pair of optical links (e.g., L1 and L2). As shown by reference number 604, assume that a second network circuit included in the optical network (e.g., C20) includes a group of network devices 250 (e.g., ND40, ND41, ND42, and ND43) connected by a set of optical links (e.g., L3, L4, and L5). For the purposes of example implementation 600, assume that CDM1 determines, based on the network circuit information, that C20 is a network circuit that is configured to map a non-OTN client signal to an OTN client signal. As shown by reference number 606, assume that a third network circuit in the optical network (e.g., CX) includes a group of network devices 250 (e.g., ND100, ND101, ND102, and ND103) connected by a set of optical links (e.g., L6, L7, and L8). For the purposes of example implementation 600, assume that CDM1 determines, based on the network circuit information, that CX includes an OTN client in switching mode.

As shown by reference number 608, CDM1 may request and receive health information (e.g., PM information, alarm information, TCM information, etc.) associated with C1 through CX at fifteen minute intervals of time (e.g., based on a configuration of CDM1). As shown by reference number 610, assume that CDM1 detects, based on the C1 health information, a health issue associated with C1 (e.g., signal degrade); detects, based on the C20 health information, a health issue associated with C20 (e.g., a connectivity error); and detects, based on the CX health information, a health issue associated with CX (e.g., a connectivity error). As shown, CDM1 may identify C1, C20, and CX as troubled network circuits.

Figure 6B:
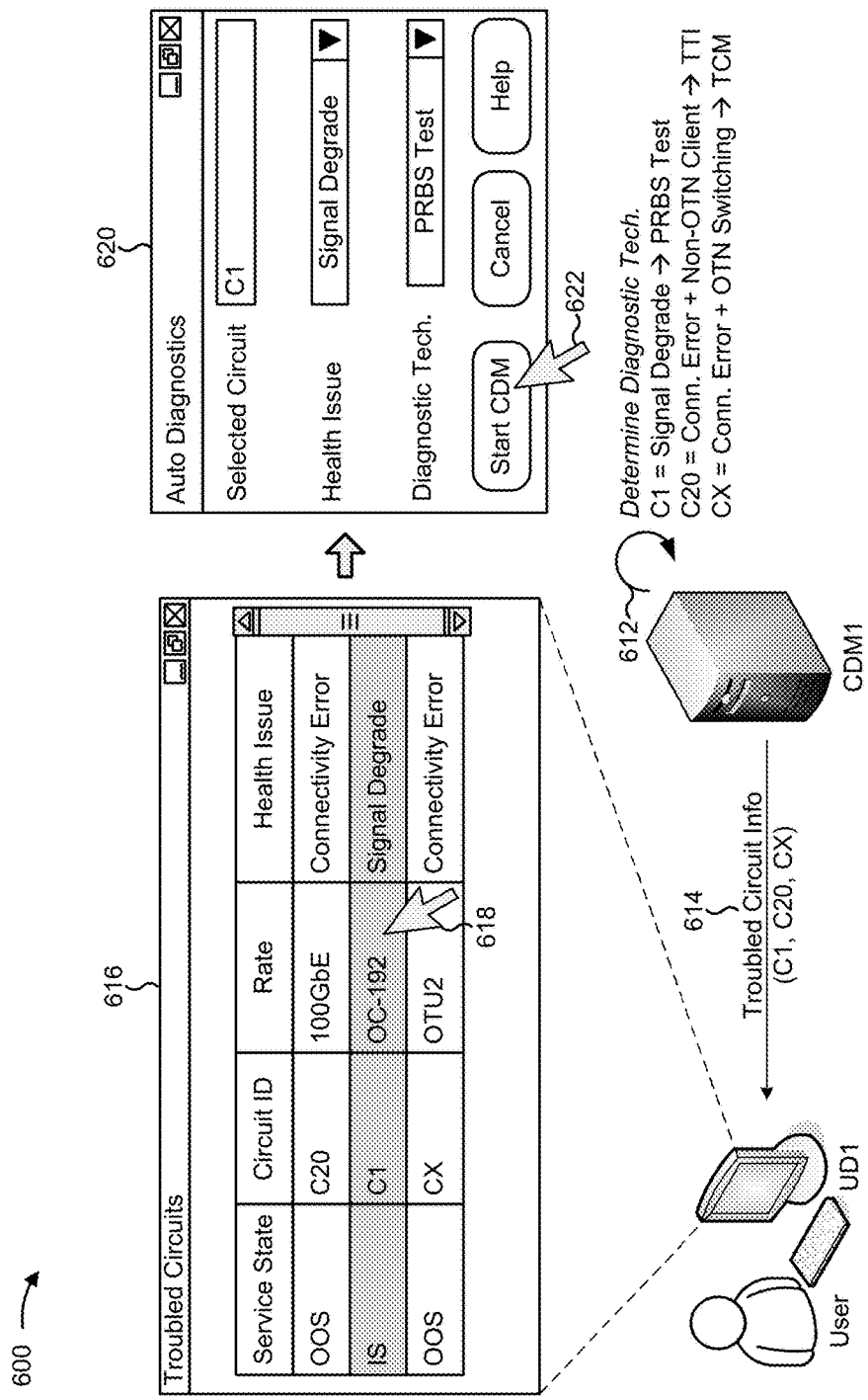

As shown in FIG. 6B, and by reference number 612, CDM1 may determine a diagnostic technique to be applied to each troubled circuit. As shown, CDM1 may determine that a PRBS test should be applied to C1 (e.g., assume that CDM1 stores information indicating that a PRBS test is to be applied to a network circuit that is experiencing a signal degrade issue). As further shown, CDM1 may determine that a TTI test should be applied to C20 (e.g., assume that CDM1 stores information indicating that a TTI test is to be applied to a network circuit that is experiencing a connectivity error when the network circuit is associated with mapping a non-OTN client signal to an OTN client signal). As also shown, CDM1 may determine that a TCM test should be applied to CX (e.g., assume that CDM1 stores information indicating that a TCM test is to be applied to a network circuit that is experiencing a connectivity error when the network circuit includes an OTN client in a switching mode).

As shown by reference number 614, CDM1 may provide troubled circuit information, associated with C1, C20, and CX, to user device 230 (e.g., UD1). As shown by reference number 616, UD1 may provide, for display to a user, the troubled circuit information, associated with C1, C20, and CX, in the form of a troubled network circuit table. As shown, the troubled network circuit table may include information indicating that C20 is out of service (OOS) due to a connectivity error, and that the carrier rate associated with service provided by C20 is 100 GbE. As further shown, the troubled network circuit table may also include information indicating that C1 is in service (IS), but is experiencing signal degrade, and that the carrier rate associated with service provided by C1 is OC-192. As further shown, the troubled network circuit information may also include information indicating that CX is out of service (OOS) due to a connectivity error within CX, and that the carrier rate associated with service provided by CX is OTU2. As shown by reference number 618, the user may identify (e.g., by selecting a corresponding row in the displayed table) C1 for potential diagnosis.

As shown by reference number 620, UD1 may display, to the user, a user interface that includes information that identifies the selected troubled network circuit (e.g., C1), information that identifies the health issue associated with C1 (e.g., signal degrade), and information that identifies the diagnostic technique for C1 (e.g., PRBS test). As shown by reference number 622, the user may indicate (e.g., by selecting a Start CDM button) that CDM1 is to apply the PRBS test to C1.

Figure 6C:
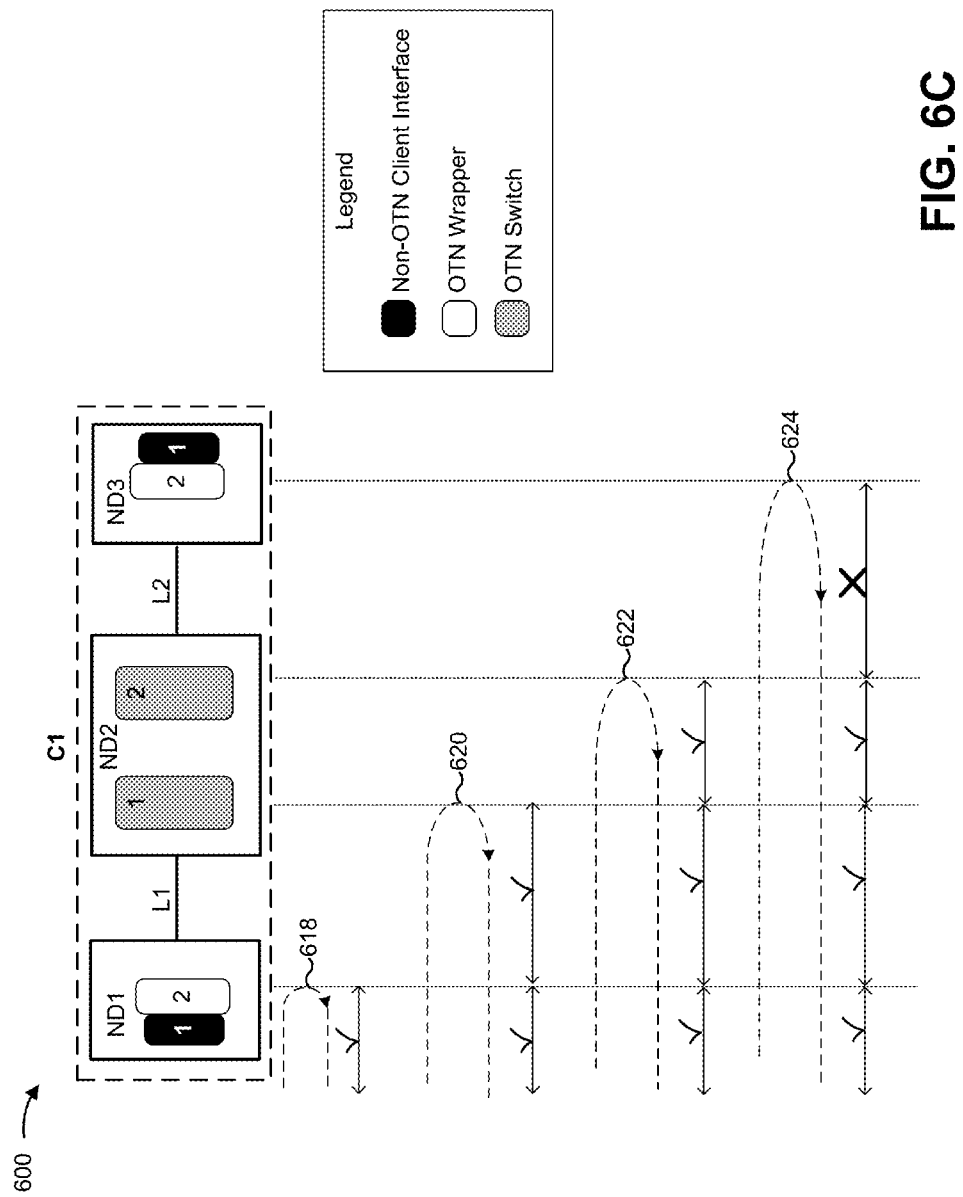

FIG. 6C shows an example implementation of a manner in which CDM1 may apply the PRBS test to C1. As shown in FIG. 6C, assume that CDM1 determines (e.g., based on the network circuit information) that ND1, included in C1, is configured to map a non-OTN client signal to an OTN client signal (e.g., at a client layer) and wrap (or unwrap) the OTN client signal with an OTN wrapper (e.g., at a digital layer). Further assume that CDM1 determines that ND2, included in C1, is configured to perform OTN switching (e.g., at the digital layer). Finally, assume that CDM1 determines that ND3, included in C1, is configured similar to ND1. As such, CDM1 may identify network hops associated with C1 as follows: a first network hop within ND1 (e.g., from the client layer to the digital layer), a second network hop across an optical link that connects ND1 and ND2 (e.g., L1) on the digital layer, a third network hop across ND2 (e.g., on the digital layer), a fourth network hop across an optical link that connects ND2 and ND3 (e.g., L2) on the digital layer, and a fifth network hop within ND3 (e.g., from the digital layer to the client layer). In some implementations, in order to apply the PRBS test to C1, CDM1 may put the service provided by C1 into a maintenance mode, and/or may enable PRBS generation and monitoring at the client layer of ND1.

As shown in FIG. 6C, and by reference number 618, CDM1 may apply the PRBS test to the first network hop. As shown, CDM1 may apply the PRBS test by causing a PRBS to be generated at the client layer of ND1, provided to the digital layer of ND1, and looped back to the client layer of ND1. As shown, assume that CDM1 determines, based on the PRBS received after loopback to the client layer of ND1, that no PRBS errors exist. As such, CDM1 may determine that no fault exists within ND1.

As shown by reference number 620, CDM1 may then cause a PRBS to be generated at the client layer of ND1, provided to an ingress side of ND2 on the digital layer (e.g., via L1), and looped back to the client layer of ND1. As shown, assume that CDM1 determines, based on the PRBS received after loopback to the client layer of ND1, that no PRBS errors exist. As such, CDM1 may determine that no fault exists across L1.

As shown by reference number 622, CDM1 may then cause a PRBS to be generated at the client layer of ND1, provided to the egress side of ND2 on the digital layer (e.g., across ND2), and looped back to the client layer of ND1. As shown, assume that CDM1 determines, based on the PRBS received after loopback to the client layer of ND1, that no PRBS errors exist. As such, CDM1 may determine that no fault exists within ND1.

As shown by reference number 624, CDM1 may then cause a PRBS to be generated at the client layer of ND1, provided to an ingress side of ND3 on the digital layer (e.g., via L1, ND2, and L2), and looped back to the client layer of ND1. As shown, assume that CDM1 determines, based on the PRBS received after loopback to the client layer of ND1, that a PRBS error exist. As such, CDM1 may determine that a fault exists across L2.

Figure 6D:
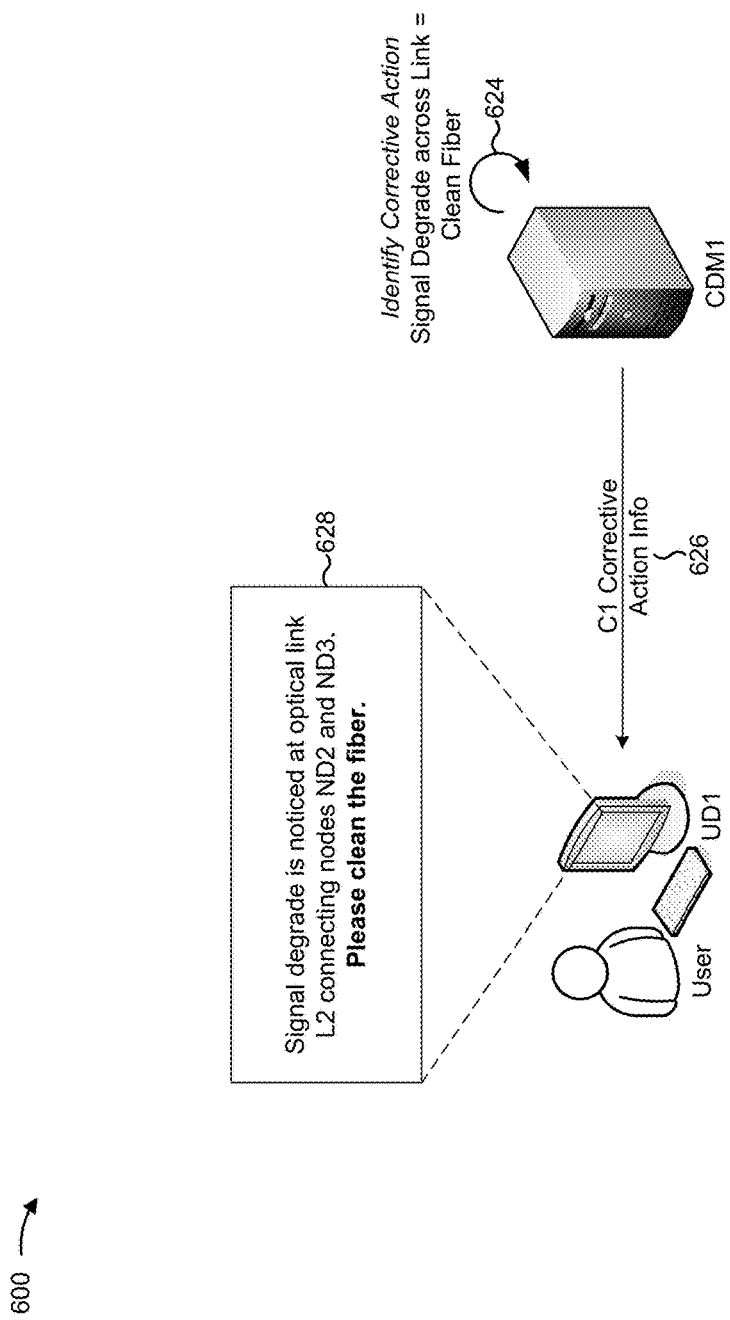

As shown in FIG. 6D, and by reference number 624, based on identifying the fault causing the signal degrade as being across L2, CDM1 may identify a corrective action associated with correcting the fault (e.g., assume that CDM1 stores information indicating that a corrective action for an optical link causing signal degrade is to clean the optical fiber). As shown by reference number 626, CDM1 may provide to UD1, information associated with the C1 corrective action. As shown by reference number 628, UD1 may provide, for display to the user, the information associated with the C1 corrective action in order to allow the user to take the corrective action (e.g., Signal degrade is noticed at optical link L2 connecting ND2 and ND3. Please clean the fiber.).

Figure 6E:
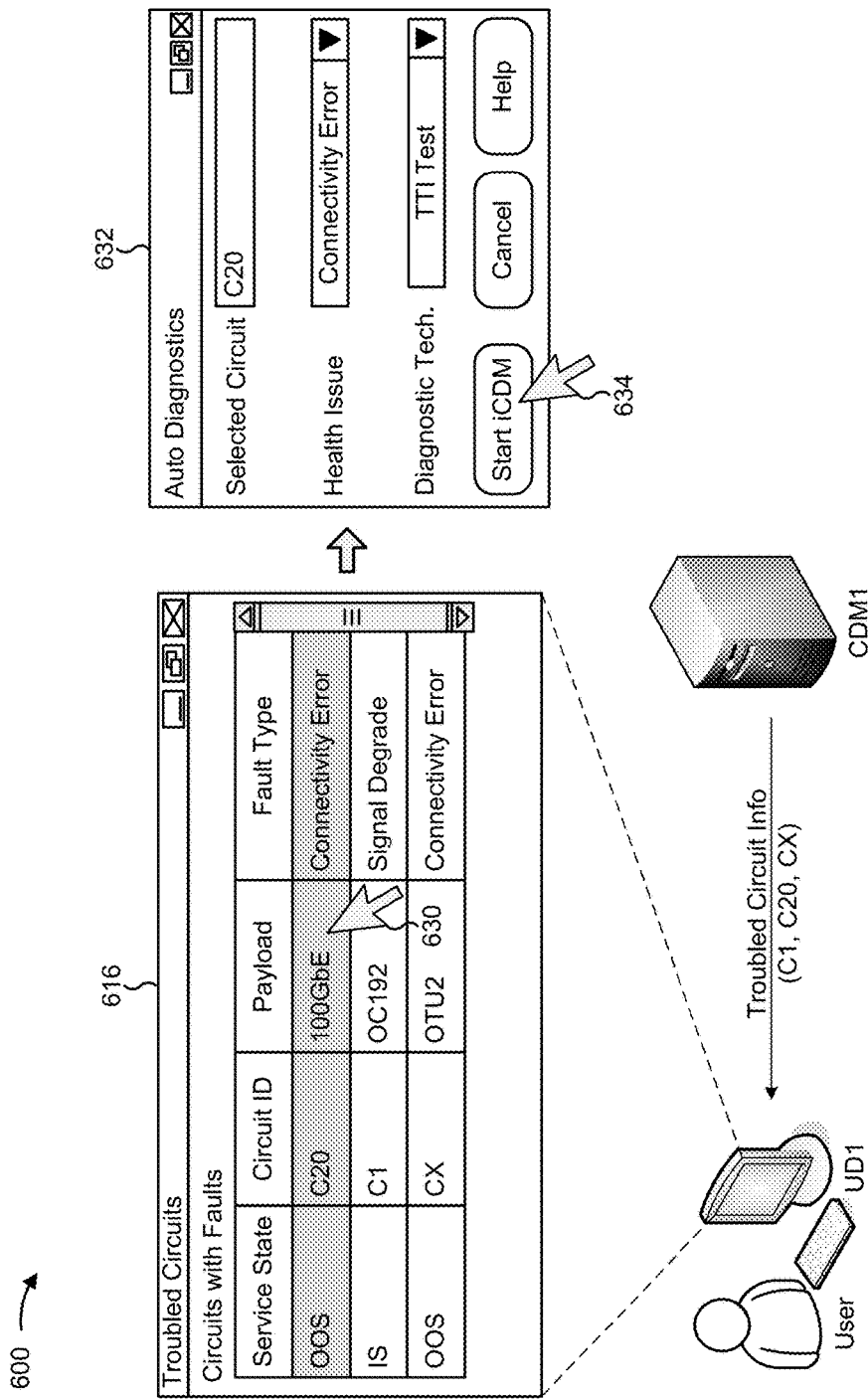
Figure 6F:
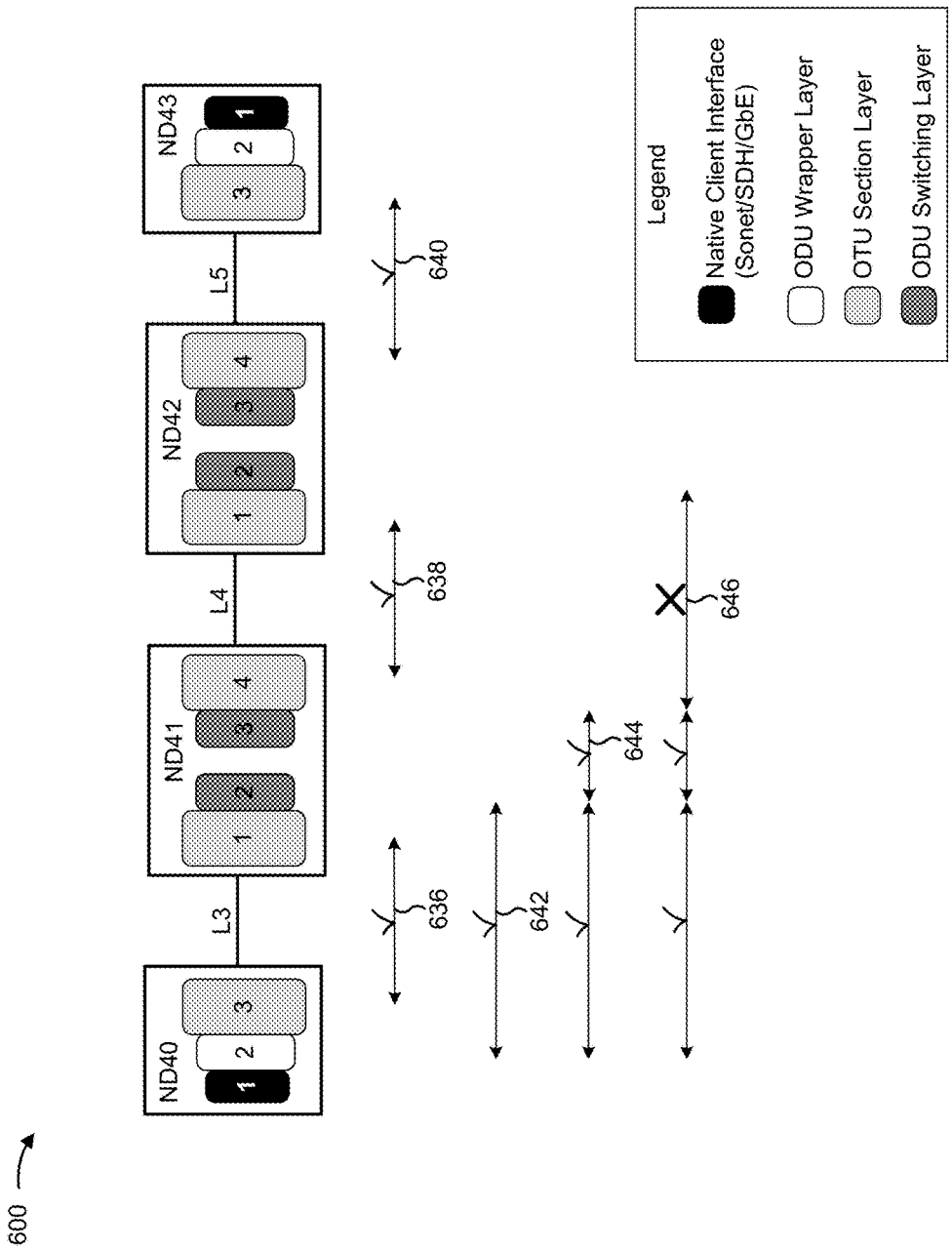
Figure 6G:
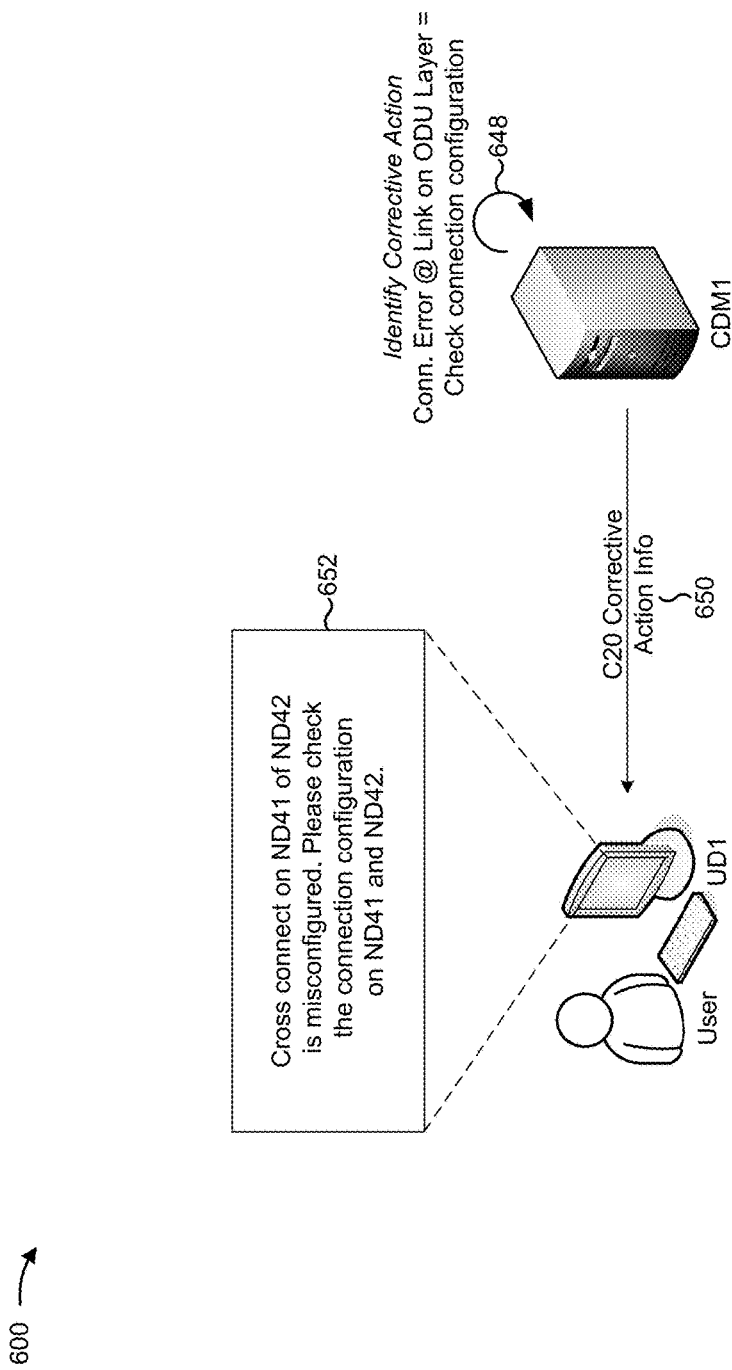

FIGS. 6E-6G are diagrams showing an example implementation of a manner in which CDM1 may apply a TTI test to a network circuit. For the purposes of FIG. 6E, assume that UD1 displays the troubled circuit information as described above with regard to reference number 616 in FIG. 6B. As shown by reference number 630, the user may identify (e.g., by selecting a corresponding row in the displayed table) C20 for potential diagnosis.

As shown by reference number 632, UD1 may display, to the user, a user interface that includes information that identifies the selected troubled network circuit (e.g., C20), information that identifies the health issue associated with C20 (e.g., connectivity error), and information that identifies the diagnostic technique for C20 (e.g., TTI test). As shown by reference number 634, the user may indicate (e.g., by selecting a Start CDM button) that CDM1 is to apply the TTI test to C20.

FIG. 6F shows an example implementation of a manner in which CDM1 may apply the TTI test to C20. As shown in FIG. 6F, assume that CDM1 determines (e.g., based on the network circuit information) that ND40, included in C20, is configured to map a non-OTN client signal to an OTN client signal (e.g., at a client layer), wrap (or unwrap) the OTN client signal with an OTN wrapper at a digital layer (e.g., including an ODU wrapper layer and an OTU section layer). Further assume that CDM1 determines that ND41, included in C20, is configured to wrap (or unwrap) the OTN client signal at the digital layer (e.g., at the OTU section layer), and perform switching at the digital layer (e.g., at an ODU switching layer). Finally, assume that CDM1 determines that ND42, included in C20, is configured similar to ND41, and that ND43, included in C20, is configured similar to ND40.

In some implementations, CDM1 may be configured to apply the TTI test at successive network hops by layer. For example, CDM1 may be configured to apply the TTI test at successive network hops on a first layer first (e.g., the OTU section layer), at successive network hops on a second layer second (e.g., the ODU layer, including the ODU wrapper layer and the ODU switching layer), and so on. As such, CDM1 may identify network hops for the TTI as follows: a first network hop within between ND40 and ND41 at the OTU section layer, a second network hop between ND41 and ND42 on the OTU section layer, a third network hop between ND42 and ND43 on the OTU section layer, a fourth network hop between ND40 and ND41 on the ODU layer (e.g., the ODU wrapper layer and the ODU switching layer), a fifth network hop on ND41 on the ODU layer (e.g., the ODU switching layer), a sixth network hop between ND41 and ND42 on the ODU switching layer (e.g., the ODU wrapper layer and the ODU switching layer), a seventh network hop on ND42 on the ODU switching layer (e.g., the ODU wrapper layer and the ODU switching layer), and an eight network hop between ND42 and ND43 on the ODU layer (e.g., the ODU switching layer and the ODU wrapper layer). In some implementations, in order to apply the TTI test to C20, CDM1 may insert a TTI string at a corresponding layer, and check for TTI string matches across the network hops, as described below.

As shown in FIG. 6F, and by reference number 636, CDM1 may apply the TTI test to the first network hop. CDM1 may apply the TTI test by inserting a TTI string at the OTU section layer in ND40, transmitting the TTI string across the first network hop, and determining whether the TTI string received at the OTU section layer in ND41 matches the TTI string inserted at the OTU section layer of ND40. As shown, assume that CDM1 determines that the received TTI string matches the transmitted TTI string. As such, CDM1 may determine that the connectivity error is not at the OTU section layer on the first network hop. As shown by reference numbers 638 and 640, CDM1 may determine, in a similar manner, that the connectivity error is not at the OTU section layer on the second network hop or the third network hop.

As shown by reference number 642, CDM1 may then apply the TTI test at the ODU layer by inserting a TTI string at the ODU wrapper layer in ND40, transmitting the TTI string across the first network hop, and determining whether the TTI string received at the ODU switching layer in ND41 matches the TTI string inserted at the ODU wrapper layer of ND40. As shown, assume that CDM1 determines that the received TTI string matches the transmitted TTI string. As such, CDM1 may determine that the connectivity error is not at the ODU layer on the fourth network hop. As shown by reference number 644, CDM1 may determine, in a similar manner, that the connectivity error is not at the ODU layer on the fifth network hop. CDM1 may proceed with applying the TTI test to the sixth network hop and, as shown by reference number 646, may determine that a TTI string received at the switching layer of ND42 does not match a TTI string transmitted from the ODU switching layer of ND41. As such, CDM1 may determine that the connectivity error arises on the ODU switching layer between ND41 and ND42.

As shown in FIG. 6G, and by reference number 648, based on identifying the fault causing the connectivity error as being on the ODU layer between ND41 and ND42, CDM1 may identify a corrective action associated with correcting the fault (e.g., assume that CDM1 stores information indicating that a corrective action for a connectivity error on the ODU layer between two network devices 250 is to check a connection configuration associated with two network devices 250). As shown by reference number 650, CDM1 may provide to UD1, information associated with the C20 corrective action. As shown by reference number 652, UD1 may provide, for display to the user, the information associated with the C20 corrective action in order to allow the user to take the corrective action (e.g., Cross connect on ND41 or ND42 is misconfigured. Please check the connection configuration on ND41 and ND42.).

Figure 6H:
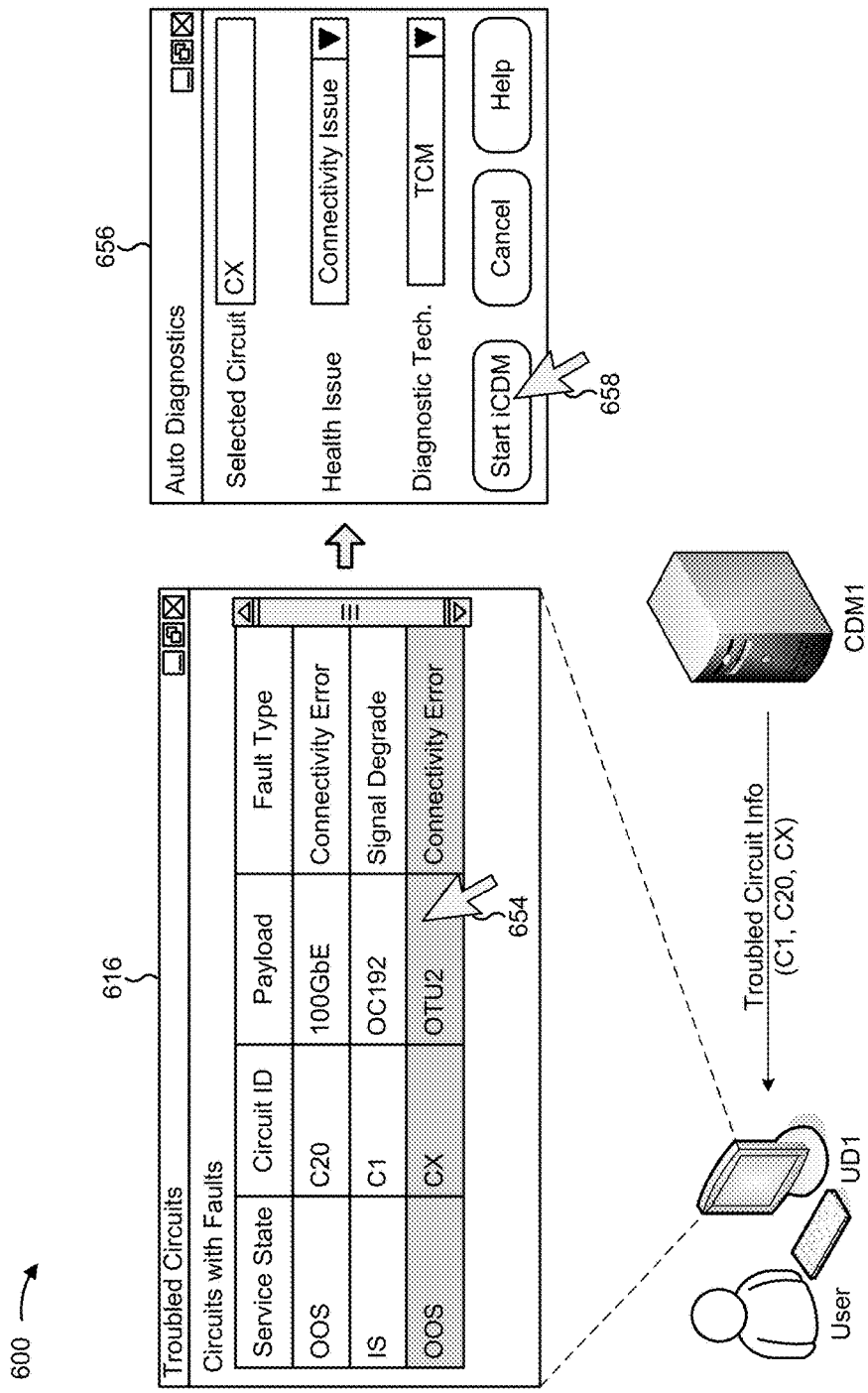
Figure 6I:
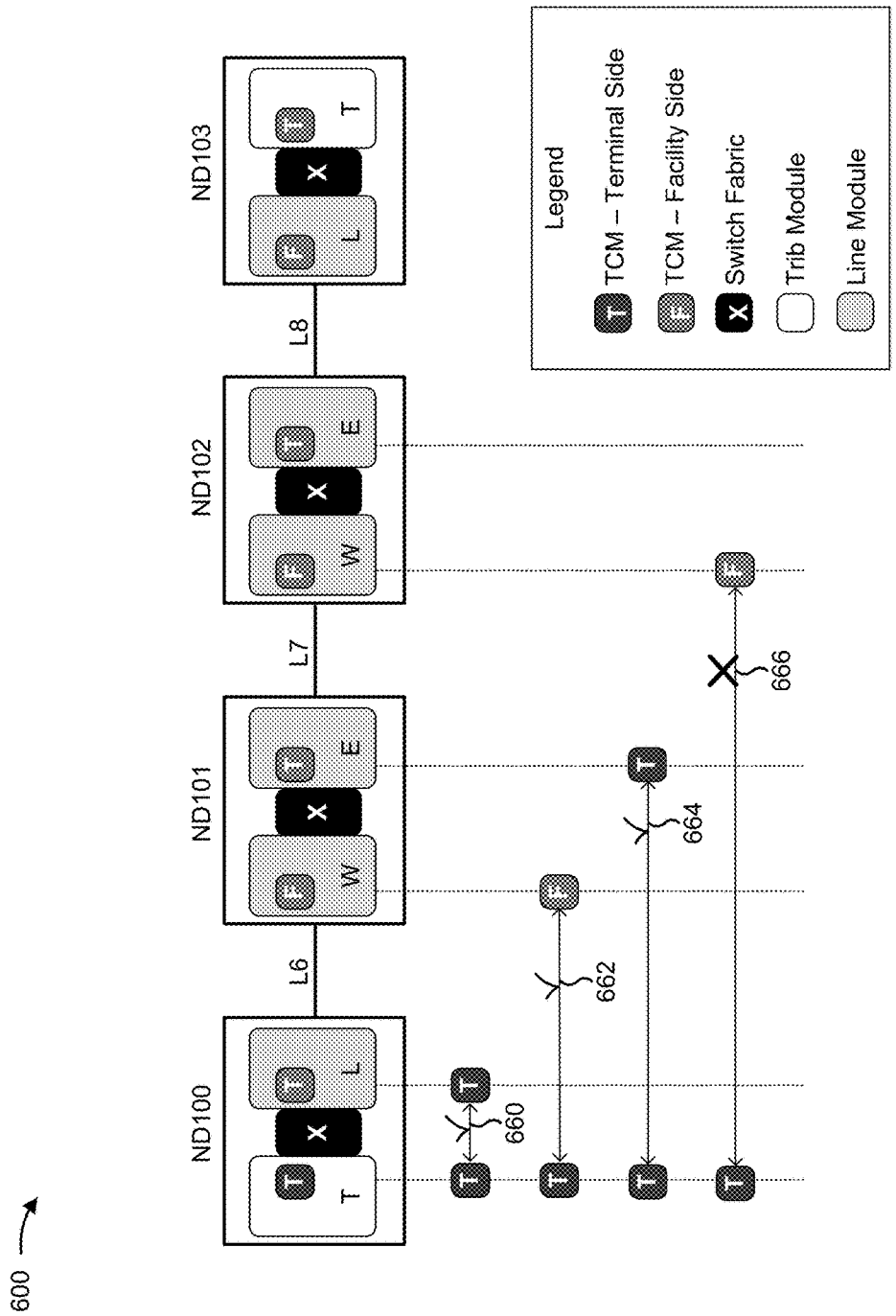
Figure 6J:
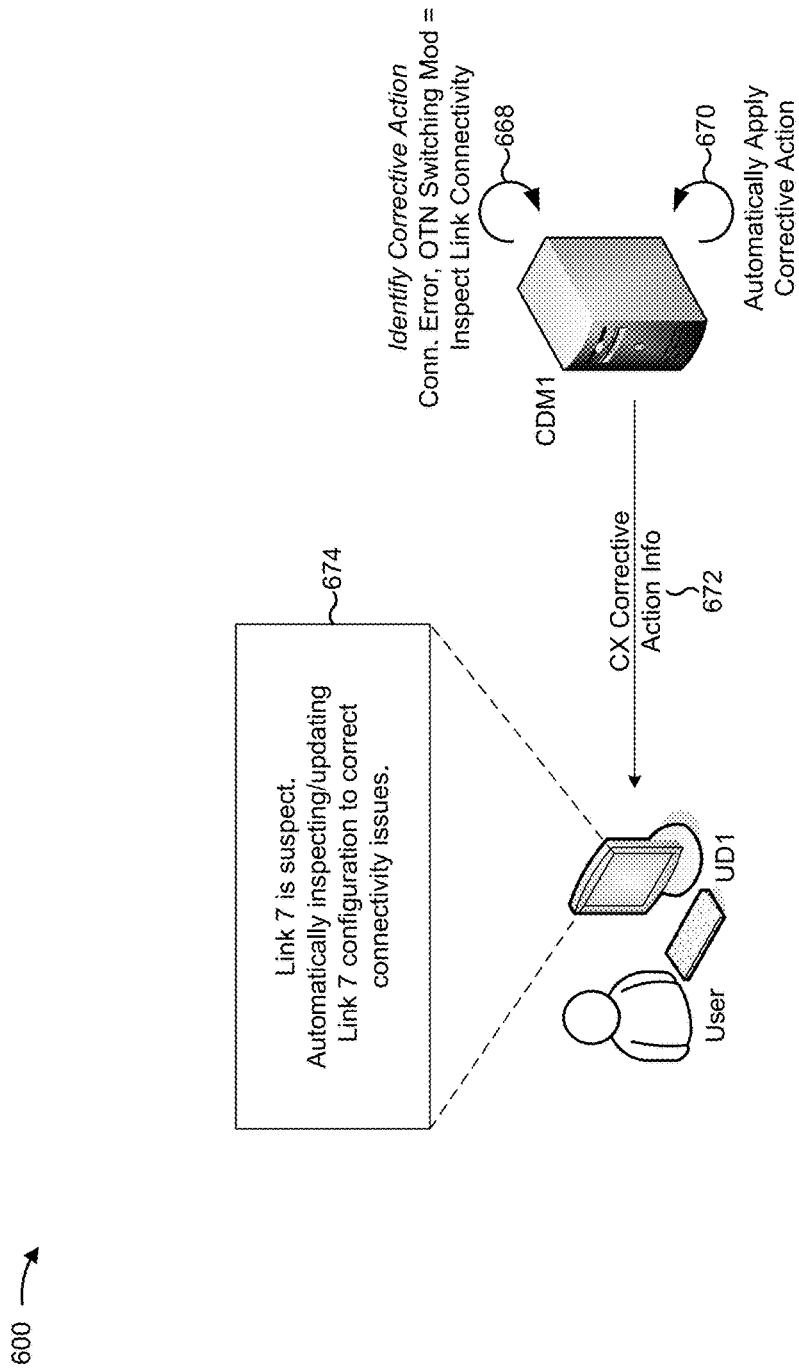

FIGS. 6H-6J are diagrams showing an example implementation of a manner in which CDM1 may apply a TCM test to a network circuit. For the purposes of FIG. 6H, assume that UD1 displays the troubled circuit information as described above with regard to reference number 616 in FIG. 6B. As shown by reference number 654, the user may identify (e.g., by selecting a corresponding row in the displayed table) CX for potential diagnosis.

As shown by reference number 656, UD1 may display, to the user, a user interface that includes information that identifies the selected troubled network circuit (e.g., CX), information that identifies the health issue associated with CX (e.g., connectivity error), and information that identifies the diagnostic technique for CX (e.g., TCM test). As shown by reference number 658, the user may indicate (e.g., by selecting a Start CDM button) that CDM1 is to apply the TCM test to CX.

FIG. 6I shows an example implementation of a manner in which CDM1 may apply the TCM test to CX. As shown in FIG. 6I, assume that CDM1 determines (e.g., based on the network circuit information) that ND100 through ND103, included in CX, are configured to act in a switching mode (e.g., across the digital layer).

In some implementations, CDM1 may be configured to apply the TCM test at successive network hops on a TCM layer (e.g., associated with the digital layer) associated with CX. As such, CDM1 may identify network hops for the TCM as follows: a first network hop within ND100 between a tributary side and a line side on the TCM layer, a second network hop between ND100 and ND101 between the line side of ND100 and a west line side of ND101 on the TCM layer (e.g., across an optical link identified as L6), a third network hop within ND101 between the west line side and an east line side on the TCM layer, a fourth network hop between ND101 and ND102 between the east line side of ND101 and a west line side of ND102 on the TCM layer (e.g., across an optical link identified as L7), a fifth network hop within ND102 between the west line side and an east line side on the TCM layer, a sixth network hop between ND102 and ND103 between the east line side of ND102 and a line side of ND103 on the TCM layer (e.g., across an optical link identified as L8), and a seventh network hop within ND103 between the line side and a tributary side on the TCM layer.

As shown in FIG. 6I, and by reference number 660, CDM1 may apply the TCM test to the first network hop. CDM1 may apply the TCM test by inserting a terminal TCM at the tributary side of ND100 (e.g., such that a TTI string is transmitted from the tributary side of ND100), adding a terminal TCM to the line side of ND100, and checking a TTI string received at the line side of ND100. Here, assume that the TTI string received at the line side of ND100 matches the TTI string transmitted from the tributary side of ND100. As such, CDM1 may determine that the cross connect within ND100 is not causing the connectivity error. CDM1 may then delete the terminal TCM on the line side of ND100.

As shown by reference number 662, CDM1 may then insert a facility TCM at the west line side of ND101, and check a TTI string received at the west line side of ND101. Here, assume that the TTI string received at the west line side of ND101 matches the TTI string transmitted from the tributary side of ND100. As such, CDM1 may determine that the link between ND100 and ND101 (e.g., L6) is not causing the connectivity error. CDM1 may then delete the facility TCM on the west line side of ND101.

As shown by reference number 664, CDM1 may then insert a terminal TCM at the east line side of ND101, and check a TTI string received at the east line side of ND101. Here, assume that the TTI string received at the east line side of ND101 matches the TTI string transmitted from the tributary side of ND100. As such, CDM1 may determine that the cross connect within ND101 is not causing the connectivity error. CDM1 may then delete the terminal TCM on the east line side of ND101.

As shown by reference number 666, CDM1 may then insert a facility TCM at the west line side of ND102, and check a TTI string received at the west line side of ND102. Here, assume that the TTI string received at the west line side of ND102 does not match the TTI string transmitted from the tributary side of ND100. As such, CDM1 may determine that the link between ND101 and ND102 (e.g., L7) is causing the connectivity error.

As shown in FIG. 6J, and by reference number 668, based on identifying the fault causing the connectivity error as being on the link between ND101 and ND102, CDM1 may identify a corrective action associated with correcting the fault (e.g., assume that CDM1 stores information indicating that a corrective action for a connectivity error across a link between OTN clients in switching mode is to automatically inspect the link for connectivity issues and update a configuration of the link accordingly). As shown by reference number 670, CDM1 may automatically apply the corrective action (e.g., CDM1 may inspect and/or update a configuration of link 7 in order to correct the connectivity issue).

As shown by reference number 672, CDM 1 may provide to UD1, information associated with the CX corrective action taken by CDM1. As shown by reference number 674, UD1 may provide, for display to the user, the information associated with the CX corrective action in order to allow the user to view the information associated with the corrective action automatically taken by CDM1 (e.g., Link 7 is suspect. Automatically inspecting/updating link 7 configuration to correct connectivity issues). In some implementations, CDM1 may provide a result of taking the corrective action.

As indicated above, FIGS. 6A-6J are provided merely as examples. Other examples are possible and may differ from what was described with regard to FIGS. 6A-6J.

Implementations described herein relate to a circuit diagnostic manager that may automatically detect a troubled network circuit, associated with a health issue, in an optical network, apply an appropriate diagnostic technique to the network circuit in order to identify a fault location within the network circuit, and provide a recommended corrective action associated with correcting the fault. In this way, the circuit diagnostic manager may provide for automatic detection, diagnosis, and/or correction of a troubled network circuit in an optical network, thereby reducing a cost (e.g., in man-hours, in network circuit down time, etc.) associated with rectifying the troubled network circuit.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    an optical network including a plurality of network devices, at least one of which being a reconfigurable optical add-drop multiplexer (ROADM) that is connected to an optical fiber, the optical fiber being part of a network circuit; and
    one or more processors to:
    receive health information associated with the network circuit,
      the health information including information associated with a level of performance of the network circuit;
    determine, based on the health information and network circuit information associated with the network circuit, that the network circuit is experiencing a health issue,
    the health issue indicating that the level of performance of the network circuit does not satisfy a threshold level of performance;
        select a diagnostic technique from among a plurality of diagnostic techniques to be applied to the network circuit based on determining that the network circuit is experiencing the health issue, the plurality of diagnostic techniques including a pseudo random bit sequence (PRBS) test, a trail trace identifier test (TTI), and a tandem connection monitoring (TCM) test;
        automatically and iteratively apply the selected diagnostic technique to the network circuit in order to identify a fault location,
        the fault location identifying a location of a fault, within the network circuit, that causes the network circuit to experience the health issue, and
        said iteratively applying the selected diagnostic technique to the network circuit including repeatedly applying the selected diagnostic technique to successive portions of the network circuit;
        determine a corrective action, associated with the network circuit, based on the fault location and the health issue, the corrective action including an action to be taken in order to cause the level of performance of the network circuit to satisfy the threshold level of performance; and
        provide information associated with the corrective action to cause the corrective action to be taken.

2. The system of claim 1, where the one or more processors, when selecting the diagnostic technique, are to:
    identify the selected diagnostic technique based on the health issue and the network circuit information.

3. The system of claim 1, where the one or more processors, when automatically and iteratively applying the selected diagnostic technique to the network circuit, are to:
    receive an indication to apply the selected diagnostic technique to the network circuit,
      the indication being based on user input; and
    automatically and iteratively apply the selected diagnostic technique based on receiving the indication.

4. The system of claim 1, where the one or more processors, when automatically and iteratively applying the selected diagnostic technique to the network circuit, are to:
    identify, based on the network circuit information, a set of network hops included in the network circuit;
    apply the selected diagnostic technique on a first network hop of the set of network hops;
    determine that the fault location does not lie on the first network hop;
    apply the selected diagnostic technique on a second network hop of the set of network hops;
    determine that the fault location lies on the second network hop; and
    identify the fault location as a location of the second network hop.

5. The system of claim 1, where the one or more processors, when automatically and iteratively applying the selected diagnostic technique to the network circuit, are to:
    identify, based on the network circuit information, a set of layers associated with the network circuit;
    apply the selected diagnostic technique on one or more network hops on a first layer of the set of layers;
    determine, based on applying the selected diagnostic technique to the one or more network hops on the first layer, that the fault location does not lie on the first layer;
    apply the selected diagnostic technique on one or more network hops on a second layer of the set of layers;
    determine that the fault location lies on a particular network hop of the one or more network hops on the second layer; and
    identify the fault location as a location of the particular network hop and the second layer.

6. The system of claim 1, where the one or more processors, when providing the information associated with the corrective action, are to:
    cause the corrective action to be performed without user interaction.

7. The system of claim 1, where the health issue includes a signal degrade issue or a connectivity error.

8. A non-transitory computer-readable medium storing instructions, the instructions comprising:
    one or more instructions that, when executed by one or more processors, cause the one or more processors to:
    obtain health information associated with a network circuit included in an optical network, the optical network including a plurality of network devices, at least one of which being a reconfigurable optical add-drop multiplexer (ROADM) that is connected to an optical fiber, the optical fiber being part of a network circuit;
      the health information including information associated with a level of performance of the network circuit;
    identify a health issue, associated with the network circuit, based on the health information and network circuit information associated with the network circuit,
      the health issue indicating that the level of performance of the network circuit does not satisfy a threshold level of performance;

select a diagnostic technique from among a plurality of
diagnostic techniques to be applied to the network
circuit based on identifying the health issue, the plurality of diagnostic techniques including a pseudo random bit sequence (PRBS) test, a trail trace identifier test (TTI), and a tandem connection monitoring (TCM) test;
automatically and iteratively apply the selected diagnostic technique to the network circuit in order to identify a fault location,
the fault location identifying a point in the network circuit where the health issue is caused, and
said iteratively applying the selected diagnostic technique to the network circuit including repeatedly applying the selected diagnostic technique to successive portions of the network circuit;
determine a corrective action, associated with network circuit, based on the fault location and the health issue,
the corrective action including an action to be taken in order to cause the level of performance of the network circuit to satisfy the threshold level of performance; and
provide information associated with the corrective action,
the information associated with the corrective action including information associated with the fault location, and
the information associated with the corrective action being provided to cause the corrective action to be taken.

9. The non-transitory computer-readable medium of claim 8, where the one or more instructions, that cause the one or more processors to automatically and iteratively apply the selected diagnostic technique to the network circuit, cause the one or more processors to:
identify, based on the network circuit information, a set of network hops included in the network circuit;
apply the selected diagnostic technique to a first network hop of the set of network hops;
determine that the fault location is not of the first network hop;
apply the selected diagnostic technique to a second network hop of the set of network hops;
determine that the fault location is on the second network hop; and
identify the fault location as a location on the second network hop.

10. The non-transitory computer-readable medium of claim 8, where the one or more instructions, that cause the one or more processors to automatically and iteratively apply the selected diagnostic technique to the network circuit, cause the one or more processors to:
identify, based on the network circuit information, a set of layers associated with the network circuit;
apply the selected diagnostic technique to one or more networks hop on a first layer of the set of layers;
determine, based on causing the selected diagnostic technique to be applied to the one or more networks hop on the first layer, that the fault location is not on the first layer;
apply the selected diagnostic technique to one or more network hops on a second layer of the set of layers;
determine that the fault location is on a particular network hop of the one or more network hops on the second layer; and
identify the fault location as a location of the particular network hop and the second layer.

11. The non-transitory computer-readable medium of claim 8, where the one or more instructions, after providing the information associated with the corrective action, are to:
receive an indication that the corrective action has been taken; and
automatically and iteratively reapply the selected diagnostic technique to the network circuit based on receiving the indication.

12. A method, comprising: transmitting optical signals over an optical fiber provided in an optical network, the optical network including a plurality of network devices, at least one of which being a reconfigurable optical add-drop multiplexer (ROADM) that is connected to the optical fiber, the optical fiber being part of a network circuit;
receiving, by a diagnostic device, health information associated with the health information including information associated with a level of performance of the network circuit; identifying, by the diagnostic device, a health issue associated with the network circuit,
the health issue indicating that the level of performance of the network circuit does not satisfy a threshold level of performance, and the health issue being identified based on the health information and network circuit information associated with the network circuit;
selecting a diagnostic technique to be applied to the network circuit from among a plurality of diagnostic techniques, by the diagnostic device and based on the plurality of diagnostic techniques including a pseudo random bit sequence (PRBS) test, a trail trace identifier test (TTI), and a tandem connection monitoring (TCM) test,
automatically and iteratively applying, by the diagnostic device, the selected diagnostic technique to the network circuit in order to identify a fault location, the fault location identifying a location of a fault, within the network circuit, that causes the network circuit to experience the health issue, and
said iteratively applying the selected diagnostic technique to the network circuit including repeatedly applying the diagnostic technique to successive portions of the network circuit;
determining, by the diagnostic device and based on the fault location and the health issue, a corrective action,
the corrective action including an action to be taken in order to cause the level of performance of the network circuit to satisfy the threshold level of performance; and
providing, by the diagnostic device, information associated with the corrective action to cause the corrective action to be taken.

13. The method of claim 12, where selecting the diagnostic technique comprises:
selecting the diagnostic technique based on the health issue and the network circuit information.

14. The method of claim 12, where automatically and iteratively applying the selected diagnostic technique to the network circuit comprises:
identifying, based on the network circuit information, a set of network hops included in the network circuit;
applying the selected diagnostic technique on a first network hop of the set of network hops;
determining that the fault location does not lie on the first network hop;
applying the selected diagnostic technique on a second network hop of the set of network hops;
determining that the fault location lies on the second network hop; and identifying the fault location as a location of the second network hop.

15. The method of claim 12, where automatically and iteratively applying the selected diagnostic technique to the network circuit comprises:

identifying, based on the network circuit information, a set of layers associated with the network circuit;

applying the selected diagnostic technique on one or more networks hop on a first layer of the set of layers;

determining that the fault location does not lie on the first layer;

applying the selected diagnostic technique on one or more network hops on a second layer of the set of layers;

determining that the fault location lies on a particular network hop of the one or more network hops on the second layer; and identifying the fault location as a location of the particular network hop and the second layer.

16. The method of claim 12, where providing the information associated with the corrective action to cause the corrective action to be taken comprises:

causing the corrective action to be taken without user interaction.

17. The method of claim 12, further comprising:

causing the corrective action to be manually taken;

receiving an indication that the corrective action has been manually taken; and automatically and iteratively reapplying the selected diagnostic technique to the network circuit based on receiving the indication.

* * * * *